(12) United States Patent
Jung et al.

(10) Patent No.: US 10,372,626 B2
(45) Date of Patent: Aug. 6, 2019

(54) SYSTEM-ON-CHIPS AND OPERATION METHODS THEREOF

(71) Applicants: Yong-Won Jung, Seoul (KR); Sungkyoung Kim, Hwaseong-si (KR); Jun-Ho Seo, Suwon-si (KR); Taekkyun Shin, Gwangmyeong-si (KR); Sang-hwa Jin, Seongnam-si (KR)

(72) Inventors: Yong-Won Jung, Seoul (KR); Sungkyoung Kim, Hwaseong-si (KR); Jun-Ho Seo, Suwon-si (KR); Taekkyun Shin, Gwangmyeong-si (KR); Sang-hwa Jin, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 228 days.

(21) Appl. No.: 15/416,426

(22) Filed: Jan. 26, 2017

(65) Prior Publication Data

US 2017/0220487 A1    Aug. 3, 2017

(30) Foreign Application Priority Data

Feb. 2, 2016   (KR) .................. 10-2016-0013013

(51) Int. Cl.
| | |
|---|---|
| *H04L 29/06* | (2006.01) |
| *G06F 12/14* | (2006.01) |
| *G06F 12/02* | (2006.01) |
| *G06F 12/0875* | (2016.01) |
| *G06F 21/78* | (2013.01) |

(52) U.S. Cl.
CPC ...... *G06F 12/1408* (2013.01); *G06F 12/0238* (2013.01); *G06F 12/0875* (2013.01); *G06F 21/78* (2013.01); *G06F 2212/1028* (2013.01); *G06F 2212/1052* (2013.01); *G06F 2212/2024* (2013.01); *G06F 2212/2515* (2013.01); *G06F 2212/402* (2013.01); *G06F 2212/7203* (2013.01); *G06F 2221/2113* (2013.01); *Y02D 10/13* (2018.01)

(58) Field of Classification Search
None
See application file for complete search history.

(56) References Cited

U.S. PATENT DOCUMENTS

| | | |
|---|---|---|
| 6,219,771 B1 | 4/2001 | Kikuchi et al. |
| 7,412,579 B2 | 8/2008 | O'Connor et al. |
| 7,895,405 B2 | 2/2011 | Ebara et al. |
| 8,127,147 B2 | 2/2012 | Thibadeau |

(Continued)

*Primary Examiner* — Maung T Lwin
(74) *Attorney, Agent, or Firm* — Harness, Dickey & Pierce, P.L.C.

(57) ABSTRACT

A system-on-chip includes a magnetic random access memory and a security interface. The magnetic random access memory includes a plurality of memory areas, each of the plurality of memory areas having a different security level. The security interface circuitry configured to: identify a memory area from among the plurality of memory areas based on a received memory address associated with a received memory command; determine a security level associated with the identified memory area; and perform a memory operation on received data based on the received memory command and the determined security level.

17 Claims, 23 Drawing Sheets

(56) References Cited

U.S. PATENT DOCUMENTS

| | | |
|---|---|---|
| 8,250,648 B2 | 8/2012 | Kabzinski et al. |
| 8,570,799 B2 | 10/2013 | Hildebrand et al. |
| 8,711,631 B1 | 4/2014 | Asnaashai |
| 8,909,942 B1 | 12/2014 | Obukhov et al. |
| 9,135,459 B2 | 9/2015 | Kim et al. |
| 2005/0251617 A1* | 11/2005 | Sinclair .................. G06F 3/061 711/103 |
| 2006/0149917 A1* | 7/2006 | O'Connor ........... G06F 12/1441 711/173 |
| 2010/0229001 A1* | 9/2010 | Park ....................... G11C 16/22 713/190 |
| 2010/0333193 A1 | 12/2010 | Goding et al. |
| 2013/0135934 A1* | 5/2013 | Kim .................... G11C 11/5621 365/185.18 |
| 2014/0098601 A1* | 4/2014 | Park ....................... G06F 13/00 365/158 |
| 2014/0112082 A1* | 4/2014 | Lee .......................... G11C 7/20 365/189.011 |
| 2014/0115656 A1* | 4/2014 | Kim ........................ G06F 21/78 726/1 |
| 2014/0143518 A1* | 5/2014 | Kim .................... G06F 12/0223 711/207 |
| 2014/0164688 A1* | 6/2014 | Lee ........................ G06F 12/08 711/104 |
| 2014/0177325 A1* | 6/2014 | Dong ..................... G11C 11/16 365/158 |
| 2014/0223569 A1 | 8/2014 | Gail et al. |
| 2014/0281464 A1 | 9/2014 | Le et al. |
| 2014/0289446 A1 | 9/2014 | Takizawa |
| 2015/0074489 A1 | 3/2015 | Kashiwagi et al. |
| 2015/0082053 A1* | 3/2015 | Sano ................... G06F 12/1408 713/193 |
| 2015/0121168 A1* | 4/2015 | Kim .................... G06F 11/1435 714/764 |
| 2015/0154124 A1 | 6/2015 | Datta et al. |

* cited by examiner

FIG. 3A

L_TAB

| ADDR_Range | Range Characteristic |
|---|---|
| AR1 | E_L1 |
| AR2 | E_L2 |
| AR3 | E_L3 |

FIG. 3B

| Range Characteristic | Operation |
|---|---|
| E_L1 | No Enc/Dec |
| E_L2 | AES |
| E_L3 | Randomize |

FIG. 5

L_TAB

| ADDR_Range | Range Characteristic |
|---|---|
| AR1 | E_L1 |
| AR2 | E_L2 |
| AR3 | E_L3 |
| AR4 | E_L4 |
| AR5 | E_L5 |
| AR6 | E_L6 |

SYSTEM-ON-CHIPS AND OPERATION METHODS THEREOF

CROSS-REFERENCE TO RELATED APPLICATIONS

This non-provisional U.S. patent application claims priority under 35 USC § 119 to Korean Patent Application No. 10-2016-0013013, filed on Feb. 2, 2016, the entire contents of which are hereby incorporated by reference.

BACKGROUND

Field

Example embodiments relate to system-on-chips and, more particularly, to system-on-chips, and operation methods for the same, which divide and manage a nonvolatile memory area according to functions and inputs and outputs encrypted data having a security level suitable for each of the divided nonvolatile memory areas.

Description of Related Art

Volatile memory devices lose their stored data when the supply of power is interrupted. Volatile memory devices include static random access memory (SRAM), dynamic RAM (DRAM), synchronous DRAM (SDRAM), and the like. Nonvolatile memory devices retain their stored data even when the supply of power is interrupted. Nonvolatile memory devices include read only memory (ROM), programmable ROM (PROM), electrically programmable ROM (EPROM), electrically erasable and programmable ROM (EEPROM), flash memory, magnetic RAM (MRAM), phase-change RAM (PRAM), resistive RAM (RRAM), ferroelectric RAM (FRAM), and the like. Of these, MRAM is being studied as a next-generation memory due to its relatively high operating speed, relatively low power consumption, and non-volatility.

SUMMARY

At least some example embodiments of inventive concepts provide system-on-chips (SoCs) and operation methods thereof.

At least one example embodiment of inventive concepts provides a system-on-chip comprising: a magnetic random access memory; at least one processor; and a security interface. The magnetic random access memory includes at least three memory areas, and is configured to store, in response to a command signal and an address signal, encrypted data in a first memory area among the at least three memory areas based on the address signal. The at least one processor is configured to execute computer-readable instructions to: divide the magnetic random access memory into the at least three memory areas; output the command signal, the address signal, and a level information signal, the level information signal setting a security level of each of the at least three memory areas; and input and output data. The security interface is configured to: convert data received from the at least one processor into the encrypted data having a security level associated with the address signal, the security level based on the level information signal; and output the encrypted data to the magnetic random access memory.

At least one other example embodiment provides a method of operating a system-on-chip, the method comprising: dividing a magnetic random access memory into at least three memory areas; determining address ranges of the at least three memory areas; determining range characteristics for the address ranges; storing the address ranges and the range characteristics of the at least three memory areas as a level table; generating a command signal, an address signal, and data; identifying at least one of the range characteristics based on the address signal and the level table; performing an encryption operation on the data to generate encrypted data, the encryption operation based on the identified at least one range characteristic; and storing the encrypted data in a first of the at least three memory areas based on the address signal.

At least one other example embodiment provides a system-on-chip including security interface circuitry and a magnetic random access memory. The magnetic random access memory includes a plurality of memory areas, each of the plurality of memory areas having a different security level; and security interface circuitry. The security interface circuitry is configured to: identify a memory area from among the plurality of memory areas based on a received memory address associated with a received memory command; determine a security level associated with the identified memory area; and perform a memory operation on received data based on the received memory command and the determined security level.

BRIEF DESCRIPTION OF THE DRAWINGS

Inventive concepts will be described below in more detail with reference to the accompanying drawings of non-limiting example embodiments of inventive concepts in which like reference characters refer to like parts throughout the different views. The drawings are not necessarily to scale, emphasis instead being placed upon illustrating principles of inventive concepts. In the drawings:

FIG. 3A illustrates a level table according to example embodiments of inventive concepts;

FIG. 3B is an additional diagram illustrating a level table according to example embodiments of inventive concepts;

FIG. 5 illustrates a level table according to example embodiments of inventive concepts;

DETAILED DESCRIPTION

Example embodiments will now be described more fully with reference to the accompanying drawings, in which some example embodiments are shown.

Below, a system-on-chip (SoC) is used as one example for illustrating characteristics and functions of inventive concepts. However, those skilled in the art can easily understand other advantages and performances of inventive concepts according to the descriptions. Inventive concepts may be embodied or applied through other embodiments. Besides, the detailed description may be amended or modified according to viewpoints and applications, not being out of the scope, technical idea and other objects of inventive concepts.

Figure 1:
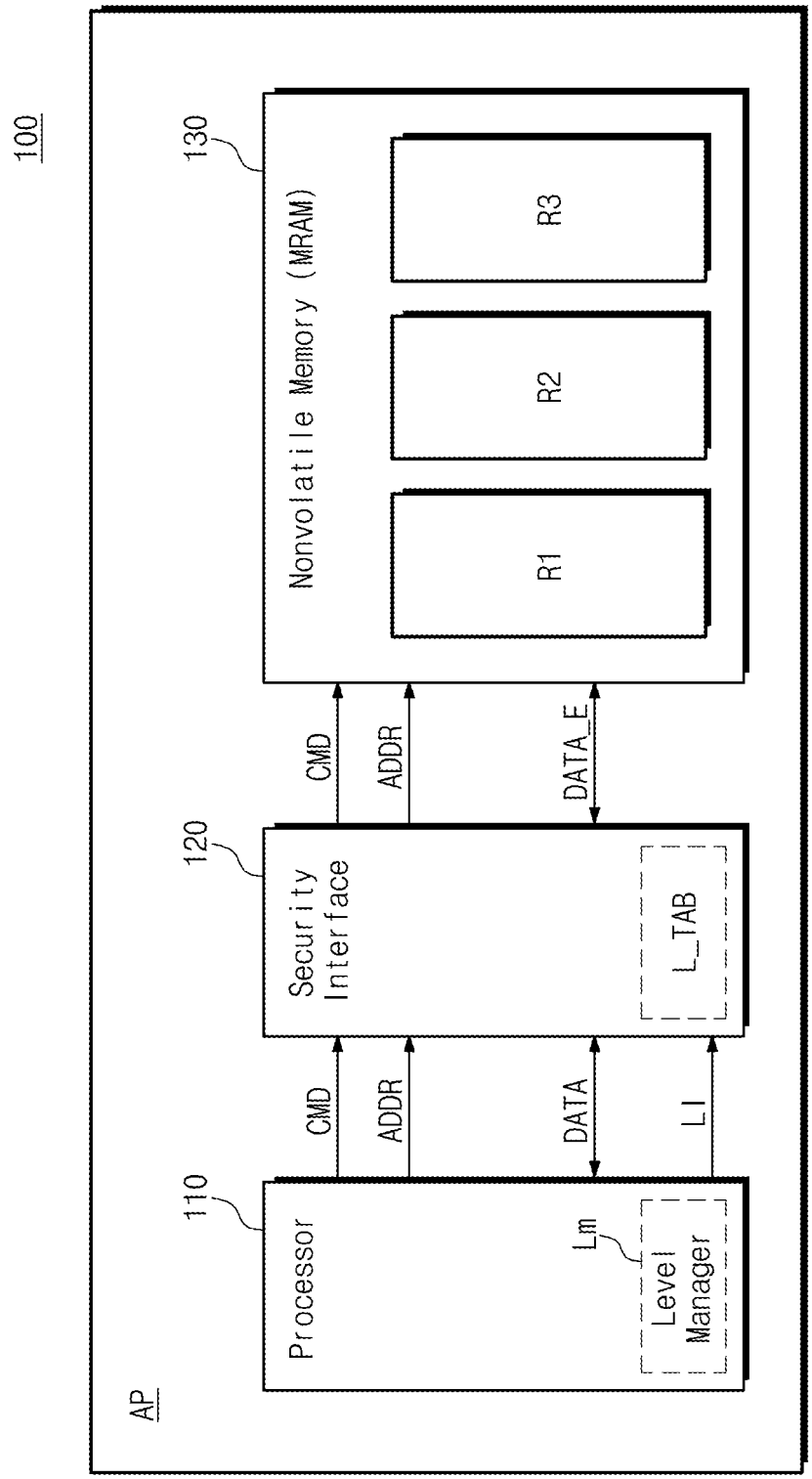
FIG. 1 is a block diagram of a system-on-chip including a nonvolatile memory according to example embodiments of inventive concepts.

FIG. 1 is a block diagram of a system-on-chip 100 including a nonvolatile memory according to example embodiments of inventive concepts. As illustrated, the system-on-chip 100 includes a processor 110, a security interface (also referred to herein as security interface circuitry) 120, and a nonvolatile memory 130. The system-on-chip 100 may be an application processor AP implemented with a system-on-chip. According to at least some example embodiments, the system-on-chip 100 and/or a memory system including the system-on-chip need not include a separate volatile memory (e.g., SRAM, DRAM, SDRAM, etc.).

The processor 110 may control the overall operation of the system-on-chip 100 and perform a logical operation. The processor 110 may include or drive a level manager LM to manage areas of the nonvolatile memory 130 according to functions. For example, the level manager LM may be a hardware circuit or software stored in a programmable read only memory (PROM).

More specifically, the level manager LM of the processor 110 may manage an area of the nonvolatile memory 130 after dividing the area into at least three areas R1, R2, and R3. For example, the level manager LM may manage the at least three areas R1, R2, and R3 after distinguish the at least three areas R1, R2, and R3 into a cache memory area, a storage area, and a main memory area, respectively. For brevity of description, it will be assumed that the cache memory area is a first area R1, the storage area is a second area R2, and the main memory area is a third area R3.

The level manager LM may manage an address range AR of each of the first to third areas R1, R2, and R3. For example, the address range AR of the first area R1 may include a plurality of physical addresses to perform a function of a cache memory. For example, the address range AR of the second area R2 may include a plurality of physical addresses to perform a function of a storage area. For example, the address range AR of the third area R3 may include a plurality of physical addresses to perform a function of a main memory.

The level manager LM may set a security level of each of the first to third areas R1, R2, and R3. For example, the first area R1 may be a cache memory area that requires highest-speed data write and read operations. Accordingly, the level manager LM may set a security level of data written and read in the first area R1 to the lowest level considering characteristics of the first area R1.

For example, the second area R2 may be a storage area that requires the highest security. Accordingly, the level manager LM may set a security level of data written and read in the second area R2 to the highest level considering characteristics of the second area R2. For example, the third area R3 may be a main memory area that requires medium-speed data write and read operations and a medium security level. Accordingly, the level manager LM may set a security level of data written and read in the third area R3 to the medium level considering characteristics of the third area R3.

The processor 110 may output information on an address range AR for managing areas of the nonvolatile memory 130 and range characteristics RC of each of the areas, e.g., information on a security level as a level information (LI) signal.

The security interface 120 is configured to receive an address signal ADDR and a command signal CMD from the processor 110 and to exchange data DATA with the processor 110. The security interface 120 may receive the level information (LI) signal.

Figure 22:
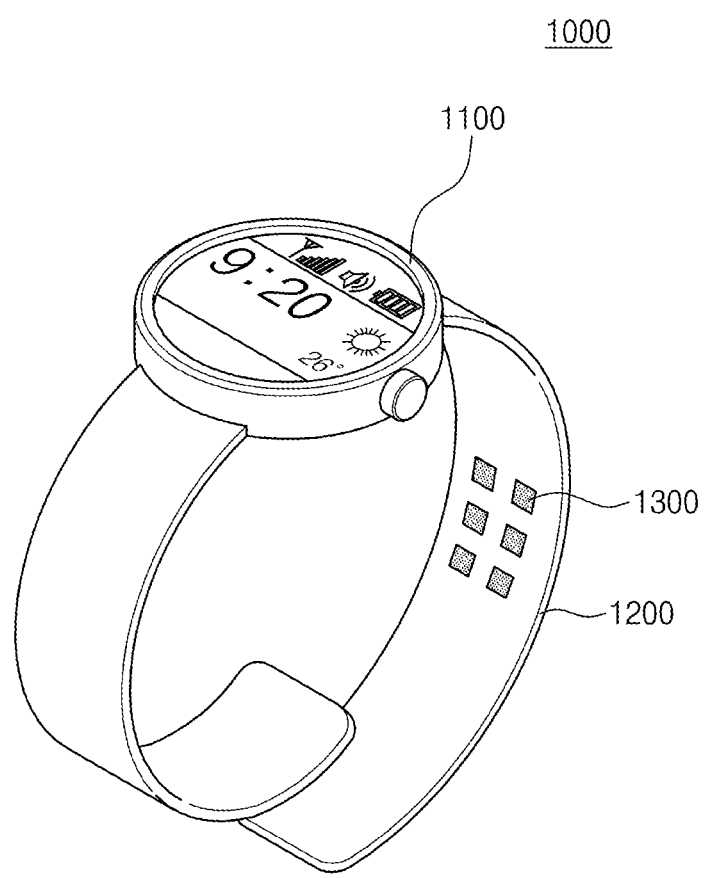
FIG. 22 illustrates a wearable device according to example embodiments of inventive concepts.
Figure 23:
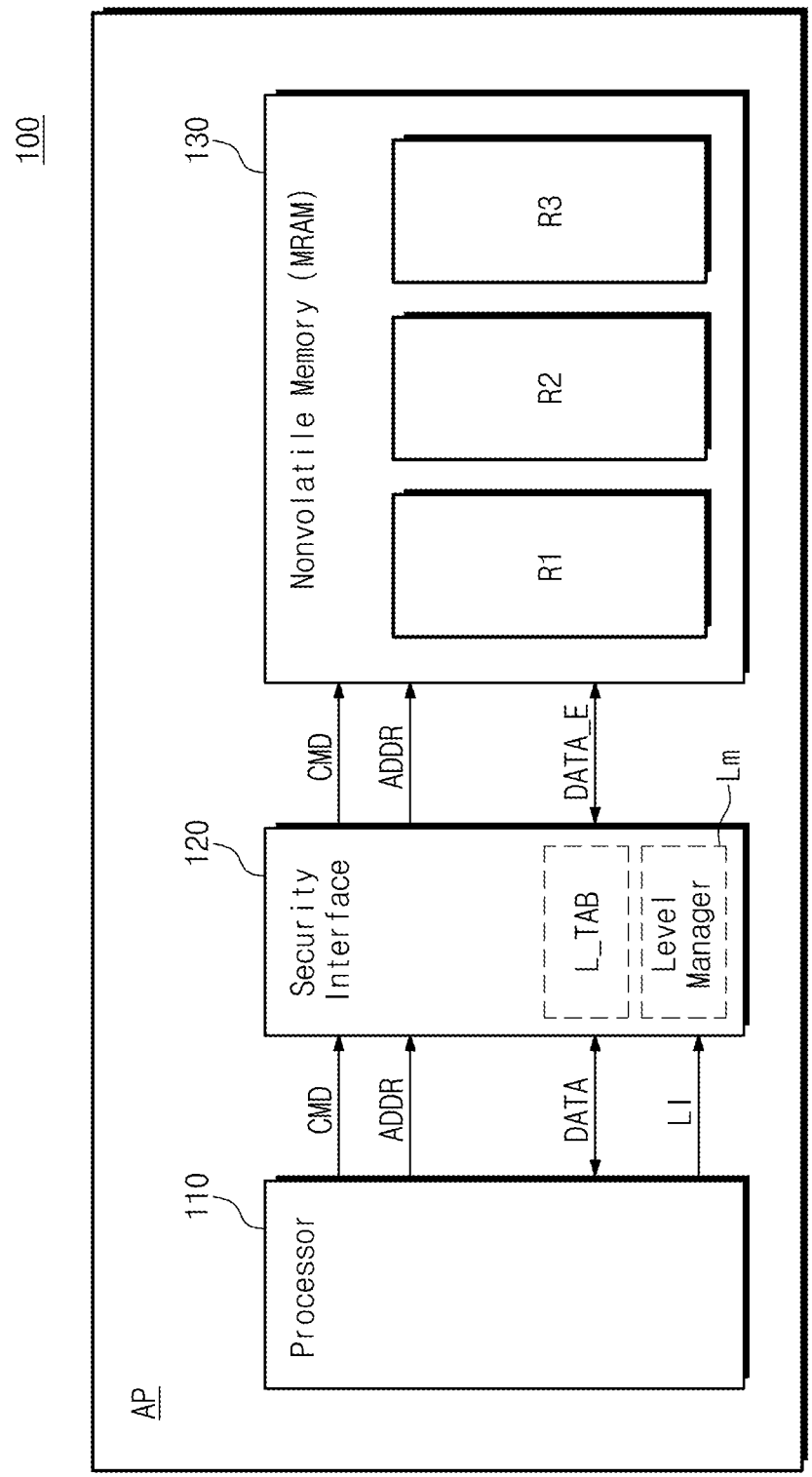
FIG. 23 is a block diagram of a system-on-chip including a nonvolatile memory according to example embodiments of inventive concepts.

The security interface 120 may perform an initial setup based on the received level information LI to determine an area including the address ADDR received from the processor 110. In the initial setup, the security interface 120 may generate a level table L_TAB based on information on the address range AR distinguished by the level manager LM and the range characteristics RC of each area. An example of the level table L_TAB generated according to the initial setup may be in the form shown in FIG. 3A or FIG. 5, and the level table L_TAB will be described in further detail with reference to accompanying drawings. As shown in FIG. 1, the level manager LM exists in the processor 110 in connection with the initial setup and the level table L_TAB exists in the security interface 120. However, it is merely an example and inventive concepts are not limited to the example. As shown in FIGS. 22 and 23 below, there may be various example embodiments.

The security interface 120 may determine the address range AR including the address ADDR received from the processor 110 using the level table L_TAB generated based on the initial setup and perform an operation according to the range characteristics of the determined address range AR. For example, the security interface 120 may determine that an area including a first address ADDR1 received from the processor 110 is the first area R1 among the first to third areas R1, R2, and R3, based on the level table L_TAB and may perform an encryption or decryption operation for first data DATA_1 received together with the first address ADDR1 according to the range characteristics RC, e.g., security level of the determined area R1.

When the command signal CMD corresponds to a write request, the security interface 120 may encrypt the data DATA received from the processor into encrypted data DATA_E according to the security level of the address range AR including the address ADDR and output the encrypted data DATA_E to the nonvolatile memory 130.

When the command signal CMD corresponds to a read request, the security interface 120 may decrypt the encrypted data DATA_E read from the nonvolatile memory 130 into the data DATA according to the security level of the address range AR including the address ADDR and output the decrypted data DATA to the processor 110.

The security interface 120 is configured to transfer the received address signal ADDR and the received command signal CMD to the nonvolatile memory 130. The security interface 120 is configured to exchange the encrypted data DATA_E with the nonvolatile memory 130. The interior configuration of an example embodiment of the security interface 120 will be described in more detail later with reference to accompanying drawings.

The nonvolatile memory 130 is configured to receive the address ADDR and the command CMD from the security interface 120 and to exchange the encrypted data DATA_E with the security interface 120. The nonvolatile memory 130 may include a nonvolatile memory such as a magnetic random access memory (MRAM), a phase-change random access memory (PRAM), a resistive random access memory (RRAM), and a ferroelectric random access memory (FRAM). In example embodiments, the nonvolatile memory 130 may be an MRAM. However, inventive concepts are not limited to the fact that the nonvolatile memory 130 is an MRAM. The nonvolatile memory 130 will be described in further detail with reference to accompanying drawings.

The system-on-chip 100 according to example embodiment of inventive concepts may write and read data by dividing an area of the nonvolatile memory 130 according to functions. In other words, for example, according to example embodiments of inventive concepts, various memories for storing data are not needed and may be omitted. Hence, when inventive concepts are implemented with a system-on-chip (SoC), it is advantageous in scaling down the SoC. Moreover, since a MRAM is a relatively low-power device, power consumption may be reduced when the MRAM is used as the nonvolatile memory 130.

Figure 2:
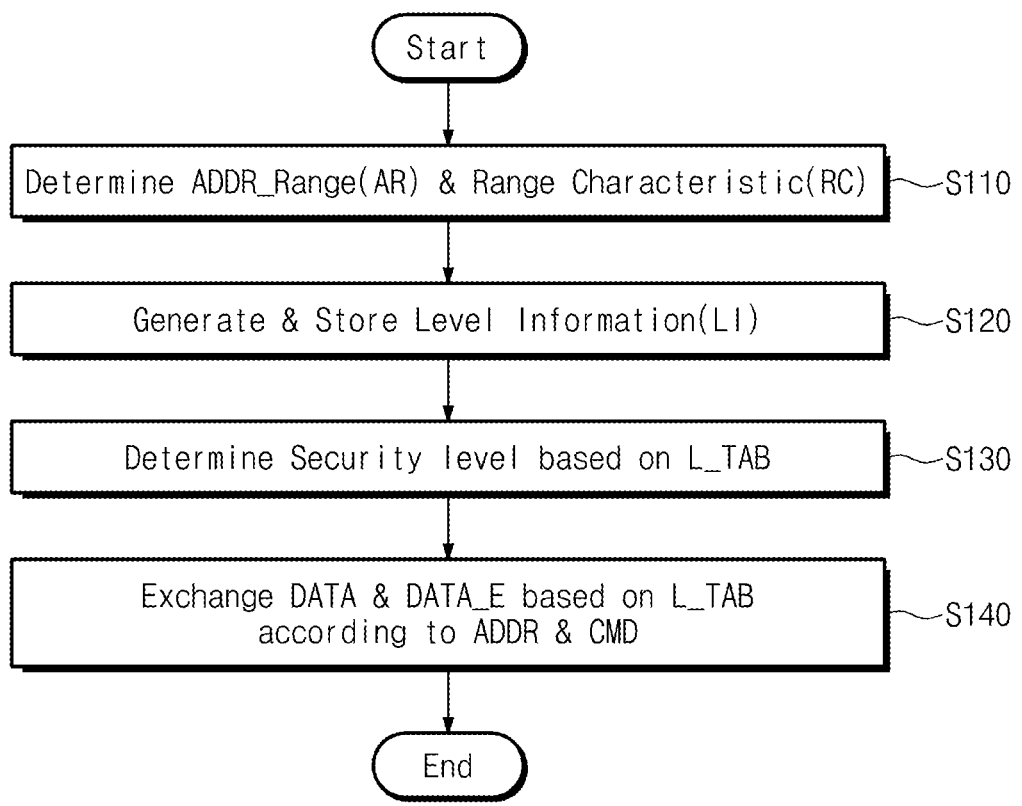
FIG. 2 is a flowchart summarizing an operation method of a system-on-chip according to example embodiments of inventive concepts.

FIG. 2 is a flowchart summarizing an operation method of a system-on-chip 100 according to example embodiments of inventive concepts.

Referring to FIGS. 1 and 2, in S110, the system-on-chip 100 may determine address ranges AR of areas R1, R2, and R3 of the nonvolatile memory 130 according to an operation environment. In example embodiments, each of the address ranges AR may include the range of a plurality of physical addresses corresponding to a plurality of memory cells constituting the nonvolatile memory 130. Also the system-on-chip 100 may determine range characteristics RC of the address ranges AR.

In S120, the system-on-chip 100 may generate the determined address ranges AR and the determined characteristics RC as a level information (LI) signal. Then the system-on-chip 100 may store the generated level information (LI) signal in the form of a level table L_TAB to perform an initial setup. In example embodiments, the level table L_TAB may be stored in the security interface 120.

In S130, the system-on-chip 100 determines an address range AR including an address ADDR and range characteristics RC. In other words, for example, the system-on-chip 100 determines an area of the address range AR including the address ADDR. The system-on-chip 100 determines a security level SL of data written into or read from the nonvolatile memory 130 according to the range characteristics RC of the determined area.

In S140, the system-on-chip 100 exchanges data DATA and encrypted data DATA_E according to a command (CMD) signal and an address (ADDR) signal. For example, the system-on-chip 100 performs an encryption operation according to the security level SL determined in S130 to generate the encrypted data DATA_E. The system-on-chip may write the encrypted data DATA_E into the nonvolatile memory 130. Alternatively, the system-on-chip 100 performs a decryption operation on the encrypted data DATA_E according to the security level SL determined in S130 to generate decrypted data. The system-on-chip 100 may read the generated decrypted data DATA from the security interface 120.

FIG. 3A illustrates a level table L_TAB according to example embodiments of inventive concepts. Referring to FIGS. 1 to 3A, the security interface 120 may generate a level table L_TAB based on the level information LI received from the processor 110. The security interface 120 may store the level table L_TAB in the security interface 120. The security interface 120 may manage the areas R1, R2, and R3 of the nonvolatile memory 130 based on the stored level table L_TAB.

The level table L_TAB in FIG. 3A includes information on a range characteristic RC corresponding to each address range AR. For example, a range characteristic RC of the address range AR1 of the first area R1 may be set to a first encryption level E_L1. For example, a range characteristic RC of the address range AR2 of the second area R2 may be set to a second encryption level E_L2. For example, a range characteristic RC of the address range AR3 of the third area R3 may be set to a third encryption level E_L3.

FIG. 3B is an additional diagram illustrating a level table L_TAB according to example embodiments of inventive concepts.

Referring to FIGS. 3A and 3B, when the range characteristic RC is set to the first encryption level E_L1, the first area R1 of the address range AR1 may indicate an area of the address range AR1 in which an encryption or decryption operation is not performed (No Enc/Dec). In example embodiments, the first area R1 in which the encryption or decryption operation is not performed may be a cache memory area.

When the range characteristic RC is set to the second encryption level E_L2, the second area R2 of the address range AR2 may indicate an area in which an advanced encryption standard (AES) operation is performed. In example embodiments, the second area R2 in which the AES is performed may be a storage area.

When the range characteristic RC is set to the third encryption level E_L3, the third area R3 of the address range AR3 may be an area in which a randomization operation is performed. In example embodiments, the area in which the randomization operation is performed may be a main memory area.

However, an operation performed according to an encryption level set to the range characteristic RC is not limited to that illustrated in FIGS. 3A and 3B. For example, when the range characteristic RC is set to the first encryption level E_L1, the first area R1 of the address range AR1 may indicate an area in which an encryption or decryption operation of the lowest level is performed.

Figure 4:
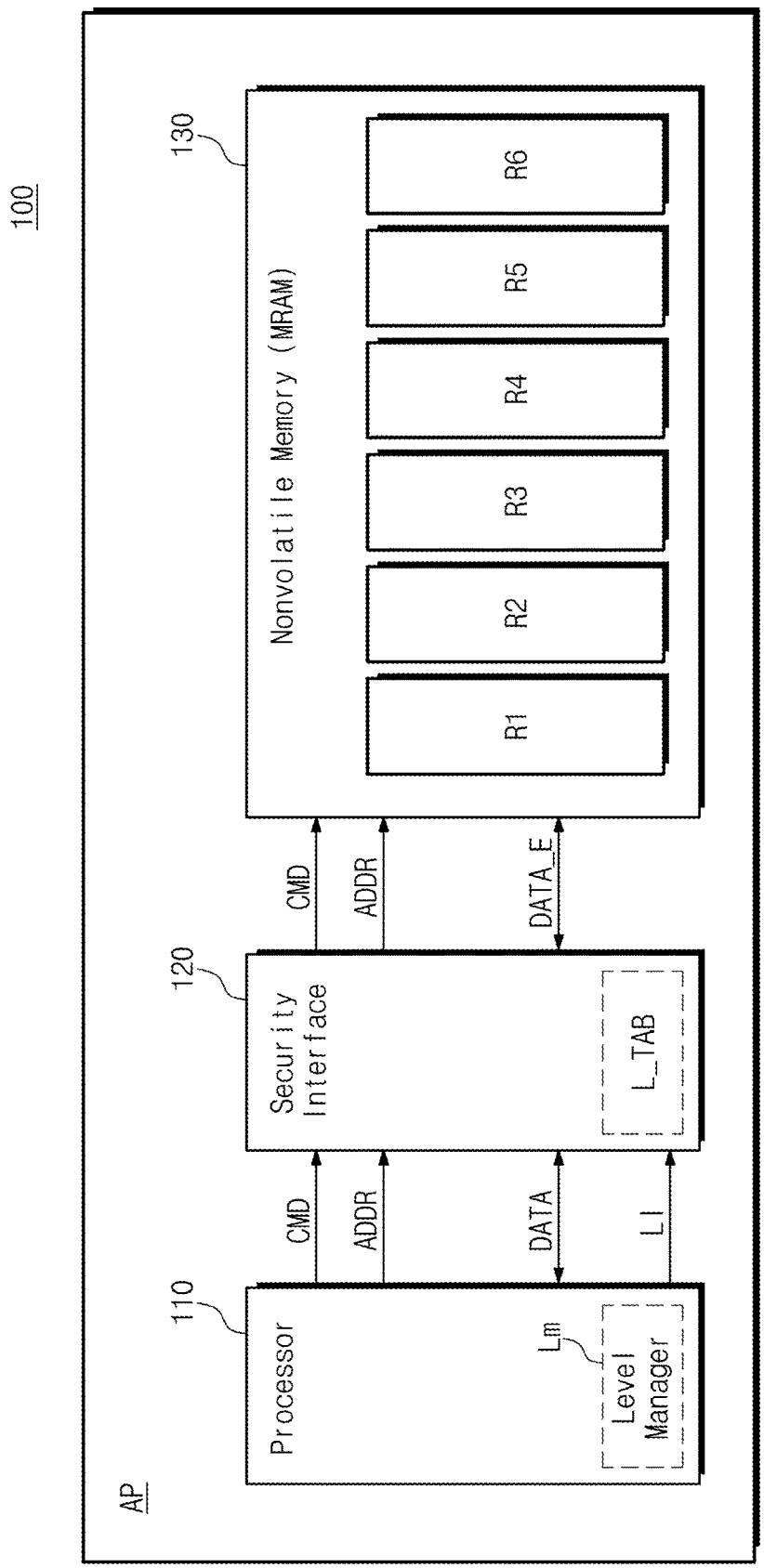
FIG. 4 is a block diagram of a system-on-chip including a nonvolatile memory according to example embodiments of inventive concepts.

FIG. 4 is a block diagram of a system-on-chip 100 including a nonvolatile memory according to example embodiments of inventive concepts. The description of the system-on-chip 100 in FIG. 4 will focus on differences from that in FIG. 1.

A level manager LM of the system-on-chip 100 in FIG. 4 may manage an area of a nonvolatile memory 130 after distinguishing the area into first to sixth areas R1 to R6. For brevity of description, it will be assumed that the first area R1 is a cache memory area, second to fourth areas R2 to R4 are storage areas, and fifth and sixth areas R5 and R6 are main memory areas.

The level manager LM of the system-on-chip 100 may manage an address range AR of each of the first to sixth areas R1 to R6. For example, an address range AR1 of the first area R1 may include the range of physical addresses to perform a function of a cache memory. For example, address ranges AR2 to AR4 of the second to fourth areas R2 to R4 may include the range of physical addresses to perform a function of a storage device. For example, address ranges AR5 and AR6 of the fifth and sixth areas R5 and R6 may include the range of physical addresses to perform a function of a main memory.

The level manger LM of the system-on-chip 100 may set a security level SL of each of the first to sixth areas R1 to R6. The first area R1 may be a cache memory area. The level manager LM may consider a characteristic of the first area R1 that requires highest-speed data write and read operation. Thus, the level manager LM may set a security level of data written into or read from the first area R1 to the lowest level.

The second to fourth areas R2 to R4 may be storage areas. The level manager LM of the system-on-chip 100 may sequentially increase security levels of the second to fourth areas R2 to R4. For example, a security level of data stored in the third area R3 is higher than that of data stored in the second area R2. For example, a security level of data stored in the fourth area R4 is higher than that of data stored in the third area R3.

The fifth and sixth areas R5 and R6 may be buffer memory areas. The level manager LM of the system-on-chip 100 may sequentially increase security levels of the fifth and sixth areas R5 and R6. For example, a security level of data stored in the fifth area R5 is higher than that of data stored in the sixth area R6.

It is to be understood that except for the above differences, components in FIG. 4 and operations of the components are identical to those in FIG. 1 and will not be described in further detail.

That is, for example, the system-on-chip 100 in FIG. 4 may subdivide a security level of data. That is, for example, the system-on-chip 100 in FIG. 4 may effectively set a security level of data written into or read from a nonvolatile memory according to a driving environment. Thus, a system-on-chip writing and reading data with improved security into and from a nonvolatile memory may be provided.

FIG. 5 illustrates a level table L_TAB according to example embodiments of inventive concepts.

Referring to FIGS. 4 and 5, the security interface 120 may generate a level table L_TAB based on level information LI received from the processor 110. The security interface 120 may store the level table L_TAB in the security interface 120. The security interface 120 may manage an area of the nonvolatile memory 130 based on the stored level table L_TAB.

The level table L_TAB in FIG. 5 manages the nonvolatile memory 130 with first to sixth areas R1 to R6. The level table L_TAB in FIG. 5 includes information on range characteristics RC corresponding to address ranges AR1 to AR6 of the areas R1 to R6. For example, a range characteristic RC of the address range AR1 of the first area R1 may be set to a first encryption level E_L1. For example, a range characteristic RC of the address range AR2 of the second area R2 may be set to a second encryption level E_L2. For example, a range characteristic RC of the address range AR3 of the third area R3 may be set to a third encryption level E_L3. For example, a range characteristic RC of the address range AR4 of the fourth area R4 may be set to a fourth encryption level E_L4. For example, a range characteristic RC of the address range AR5 of the fifth area R5 may be set to a fifth encryption level E_L5. For example, a range characteristic RC of the address range AR6 of the sixth area R6 may be set to a sixth encryption level E_L6.

Referring to FIGS. 4 and 5, when the range characteristic RC is set to the first encryption level E_L1, the first area R1 of the address range AR1 may indicate an area in which an encryption or decryption operation is not performed. In example embodiments, the first area R1 in which the encryption or decryption operation is not performed may be a cache memory area.

When the range characteristic RC is set to the second encryption level E_L2, the second area R2 of the address range AR2 may indicate an area in which a first advance encryption standard (AES) operation is performed using a key having k bits (k being a positive integer).

When the range characteristic RC is set to the third encryption level E_L3, the third area R3 of the address range AR3 may indicate an area in which a second encryption (e.g., AES) operation is performed using a key having m bits (m>k, m being a positive integer). For example, the key of the second encryption (AES) operation may be longer than the key of the first encryption (AES) operation. Accordingly, encryption data generated through the second encryption (AES) operation has a higher security level than encryption data generated through the first encryption (AES) operation.

When the range characteristic RC is set to the fourth encryption level E_L4, the fourth area R4 of the address range AR4 may indicate an area in which a third encryption (e.g., AES) operation is performed using a key having n bits (n>m, n being a positive integer). In example embodiments, the key of the third encryption (AES) operation may be longer than the key of the second encryption (AES) operation. Accordingly, encryption data generated through the third encryption (AES) operation may have a higher security level than the encryption data generated through the second encryption (AES) operation.

When the range characteristic RC is set to the fifth encryption level E_L5, the fifth area R5 of the address range AR5 may indicate an area in which a first randomization operation is performed. For example, the first randomization operation may include an additive randomization operation. In example embodiments, the area in which the randomization operation is performed may be a main memory area.

When the range characteristic RC is set to the sixth encryption level E_L6, the sixth area of the address range AR6 may indicate an area in which the second randomization operation is performed. For example, the second randomization operation may include a multiplicative randomization operation. In example embodiments, the area in which the randomization operation is performed may be a main memory area.

Figure 6:
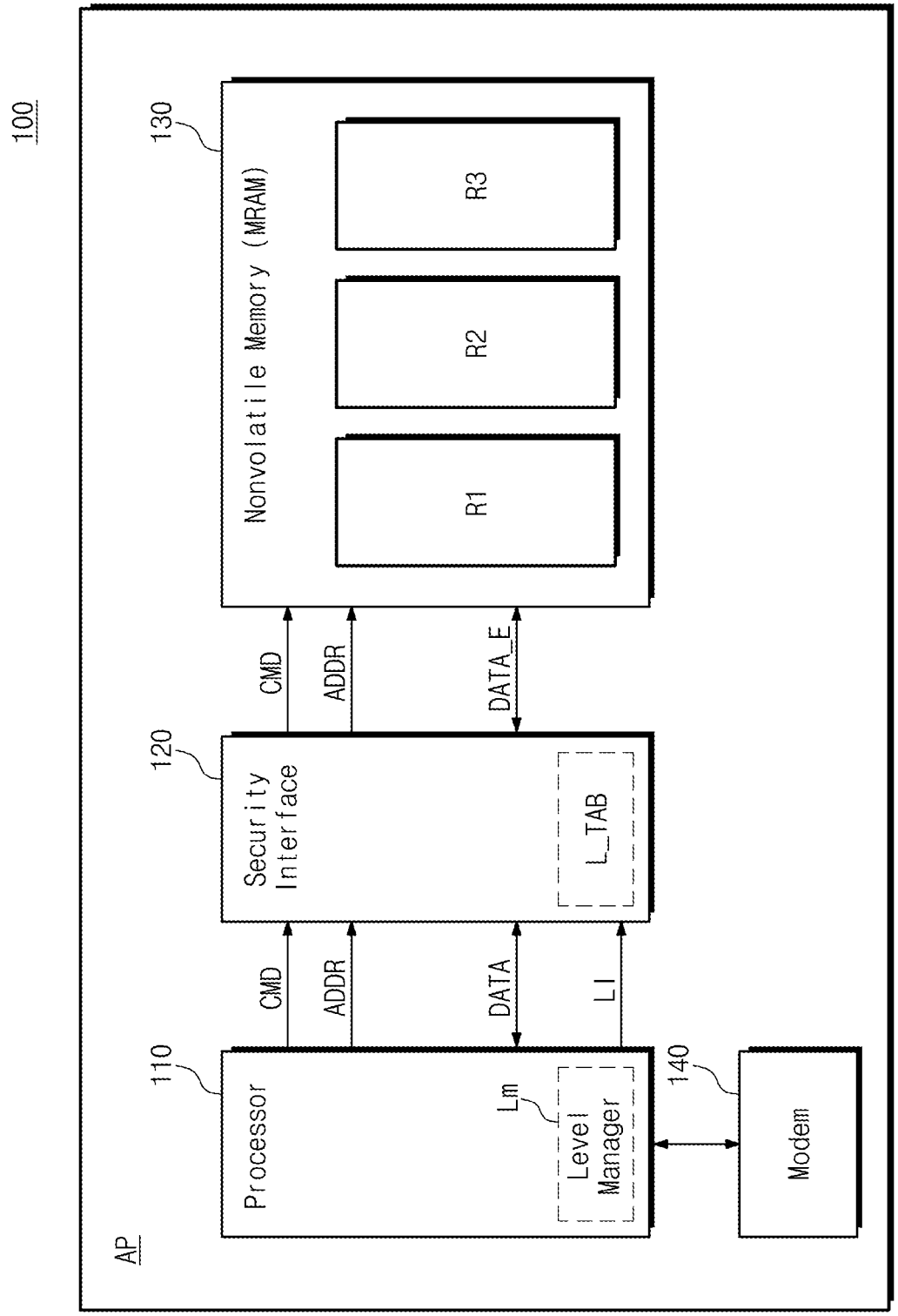
FIG. 6 is a block diagram of a system-on-chip according to example embodiments of inventive concepts which further includes a modem.

FIG. 6 is a block diagram of a system-on-chip according to example embodiments of inventive concepts. The system-on-chip shown in FIG. 6 further includes a modem 140.

Referring to FIG. 6, the modem 140 may perform wired or wireless communication with an external device according to the control of the processor 110. The modem 140 may perform communication based on at least one of various communication protocols such as wireless fidelity (Wi-Fi), code division multiple access (CDMA), long-term evolution (LTE), Bluetooth, near-field communication (NFC), etc. In example embodiments, a system-on-chip 100 including the modem 140 may be an application processor (AP) implemented with a system-on-chip (SoC).

Figure 7:
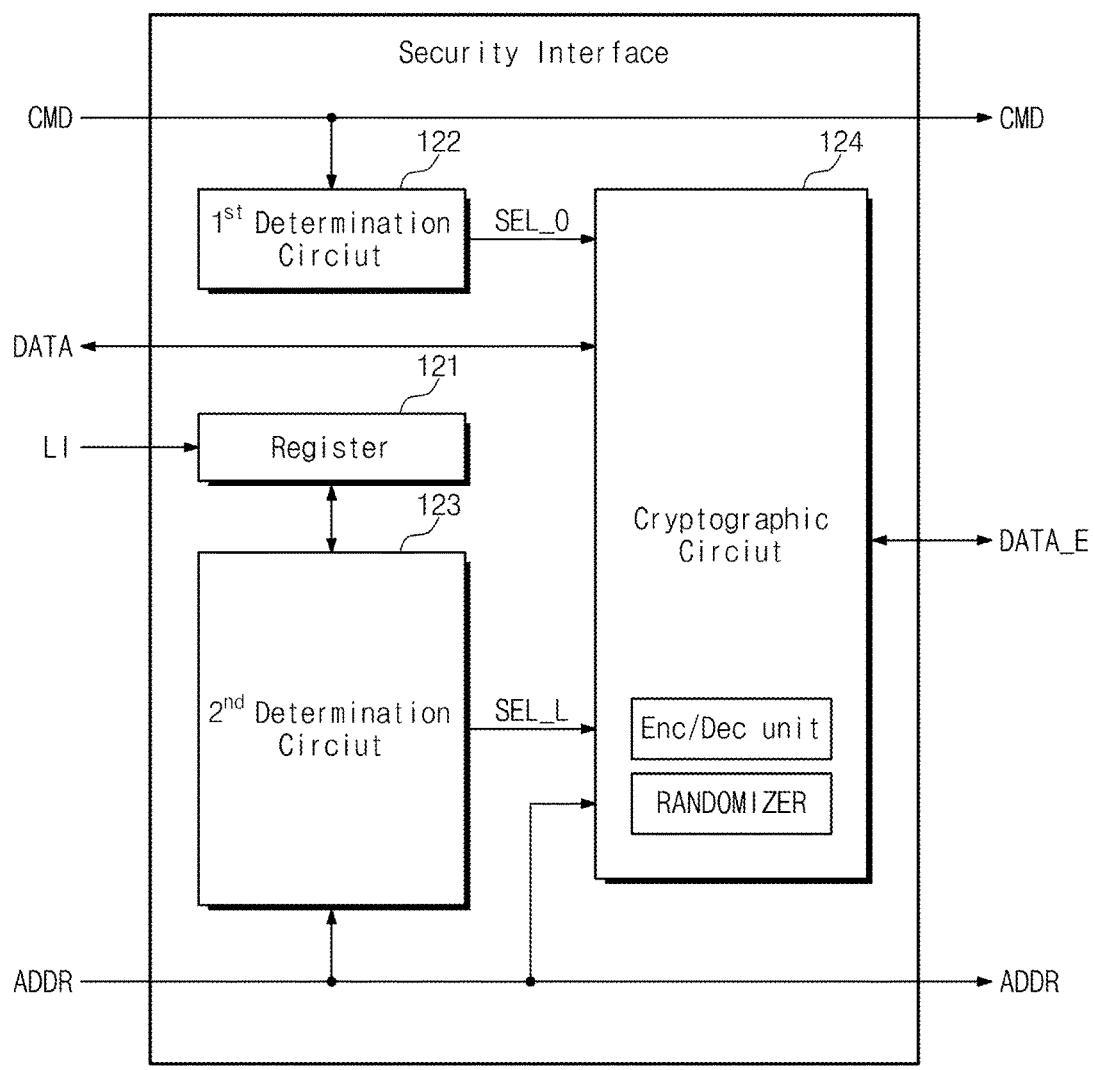
FIG. 7 is a block diagram illustrating a detailed interior configuration of a security interface according to example embodiments of inventive concepts.

FIG. 7 is a block diagram illustrating a more detailed interior configuration of an example embodiment of the security interface 120.

Referring to FIGS. 1, 2, and 7, the security interface 120 includes a register 121, a first determination circuit 122, a second determination circuit 123, and a cryptographic circuit 124.

The register 121 stores level information LI received from the processor 110 in the level table L_TAB.

The first determination circuit 122 outputs an operation select signal SEL_O based on a command signal CMD received from the processor 110. For example, when the received command signal CMD is a write signal, the first determination circuit 122 may output the operation select signal SEL_O at a high level. For example, when the received command signal CMD is a read signal, the first determination circuit 122 may output the operation select signal SEL_O at a low level.

The second determination circuit 123 may receive an address signal ADDR from the processor 110. The second determination circuit 123 may refer to the level table L_TAB stored in the register 121 according to the received address signal ADDR. The second determination circuit 123 may detect an address range AR in which the address signal ADDR is included and may output information on the range characteristic RC corresponding to the detected address range AR as a level select signal SELL.

For example, when the address signal ADDR belongs to the address range AR of the first area R1, the second determination circuit 123 may output the level select signal SEL_L as a first encryption level E_L1. For example, when the address signal ADDR belongs to the address range AR of the second area R2, the second determination circuit 123 may output the level select signal SEL_L as a second encryption level E_L2. For example, when the address signal ADDR belongs to the address range AR of the third area R3, the second determination circuit 123 may output the level select signal SEL_L as a third encryption level E_L3.

The cryptographic circuit 124 may encrypt and output data DATA as encrypted data DATA_E based on the level select signal SELL when the operation select signal SEL_O is at a high level. The cryptographic circuit 124 may output the encrypted data DATA_E generated by performing an encryption operation to the nonvolatile memory 130. For example, an encryption operation performed by the cryptographic circuit 124 may include an encryption operation using an encryption algorithm (e.g., AES algorithm) and an encryption operation using a random sequence (RS).

The cryptographic circuit 124 may output the data DATA decrypted by performing a decryption operation to the processor 110. For example, a decryption operation performed by the cryptographic circuit 124 may include a decryption operation using an encryption algorithm (e.g., AES algorithm) and a de-randomization operation using a random sequence (RS).

The cryptographic circuit 124 may decrypt and output the encrypted data DATA_E based on a level select signal SELL as data DATA when an operation select signal SEL_O is low. The cryptographic circuit 124 may output the data DATA to the processor 110.

The cryptographic circuit 124 includes an encryption/decryption unit configured to generate encrypted data DATA_E and a randomizer configured to perform a randomization operation.

The encryption/decryption unit encrypts data based on an encryption algorithm. For example, the encryption algorithm may be an advanced encryption standard (AES) algorithm or a data encryption standard (DES) algorithm. The encryption/decryption unit may further include a random number generator (not shown). The encryption/decryption unit may generate a secure key based on a random number RN and a received address signal ADDR. The encryption/decryption unit encrypts data to be stored in an area corresponding to the address signal ADDR using the secure key.

The randomizer may obtain a seed from an externally received address signal ADDR. The randomizer may generate a random sequence RS with reference to the seed. The randomizer may randomize the data to be stored in the area corresponding to the address signal ADDR using the random sequence. For example, the randomizer may randomize or de-randomize bits of each random sequence RS and bits of each received data DATA according to exclusive OR (XOR) operation.

The cryptographic circuit 124 may activate or deactivate the encryption/decryption unit or the randomizer in response to the level select signal SEL_L.

For example, when a level select signal SEL_L having a first encryption level E_L1 is received by the cryptographic circuit 124, the cryptographic circuit 124 does not activate the encryption/description unit and the randomizer. That is, for example, the cryptographic circuit 124 may output the received data DATA as encrypted data DATA_E without an encryption operation.

For example, when a level select signal SELL having a second encryption level E_L2 is received by the cryptographic circuit 124, the cryptographic circuit 124 activates the encryption/decryption unit. That is, the cryptographic circuit 124 may output encrypted data DATA_E generated based on an AES algorithm.

For example, when a level select signal SELL having a third encryption level E_L3 is received by the cryptographic circuit 124, the cryptographic circuit 124 activates the randomizer. That is, for example, the cryptographic circuit 124 may output encrypted data DATA_E generated by performing a randomization operation.

Figure 8:
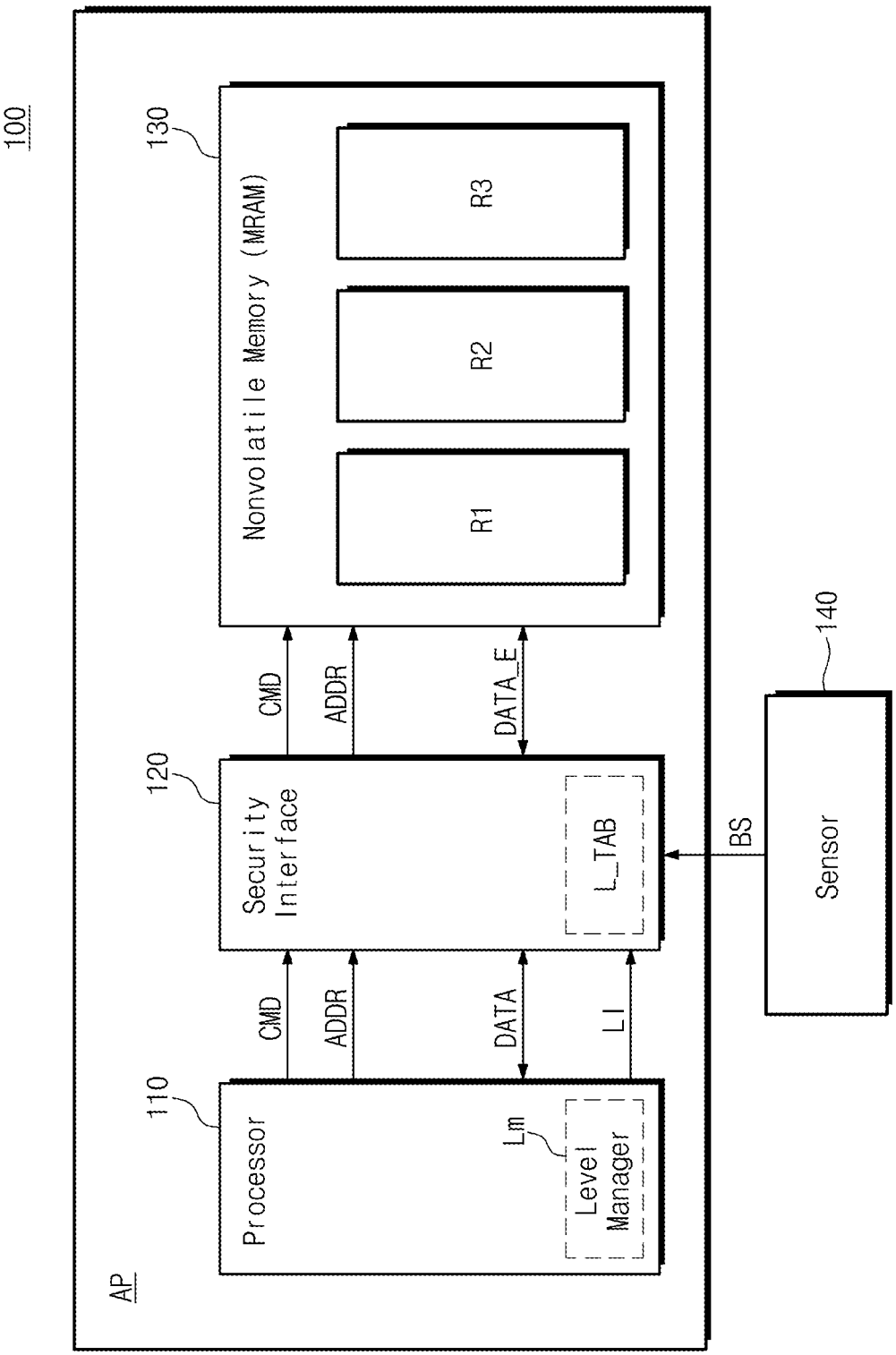
FIG. 8 is a block diagram of a system-on-chip according to example embodiments of inventive concepts which further includes a sensor.

FIG. 8 is a block diagram of a system-on-chip according to example embodiments of inventive concepts. The system-on-chip shown in FIG. 8 further includes a sensor 140.

Referring to FIG. 8, the sensor 140 is attached to a user's body to output a bio signal BS. The measured bio signal BS is transferred to a security interface. The transferred bio signal may be used in an encryption operation For example, a bio signal BS may be used as the entirety or a part of a key or the entirety or a part of a seed. The configuration except for the sensor 140 in FIG. 8 is identical to the configuration in FIG. 1 and will not be described in further detail.

Figure 9:
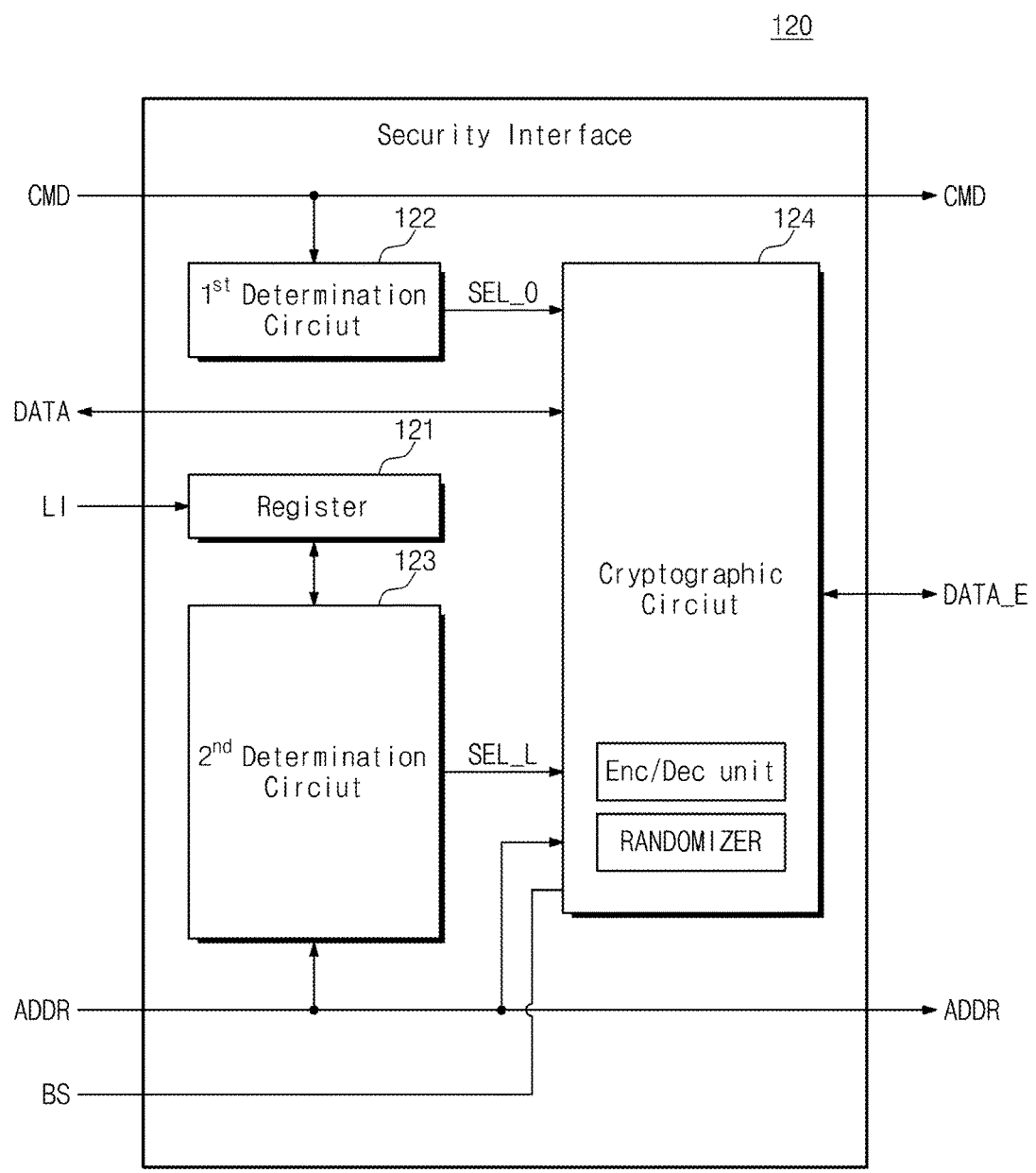
FIG. 9 illustrates a security interface of the system-on-chip including the sensor in FIG. 8.

FIG. 9 illustrates an example embodiment of the security interface of the system-on-chip including the sensor 140 in FIG. 8.

Referring to FIGS. 8 and 9, the bio signal measured from the sensor 140 is transferred to an cryptographic circuit 124 of the security interface 120.

The cryptographic circuit 124 performs an encryption operation using a bio signal BS that is a user's unique signal. Thus, security of data written into or read from the nonvolatile memory 130 may be improved. The configuration except for the cryptographic circuit 124 in FIG. 9 is identical to the configuration in FIG. 7 and will not be described in further detail.

Figure 10:
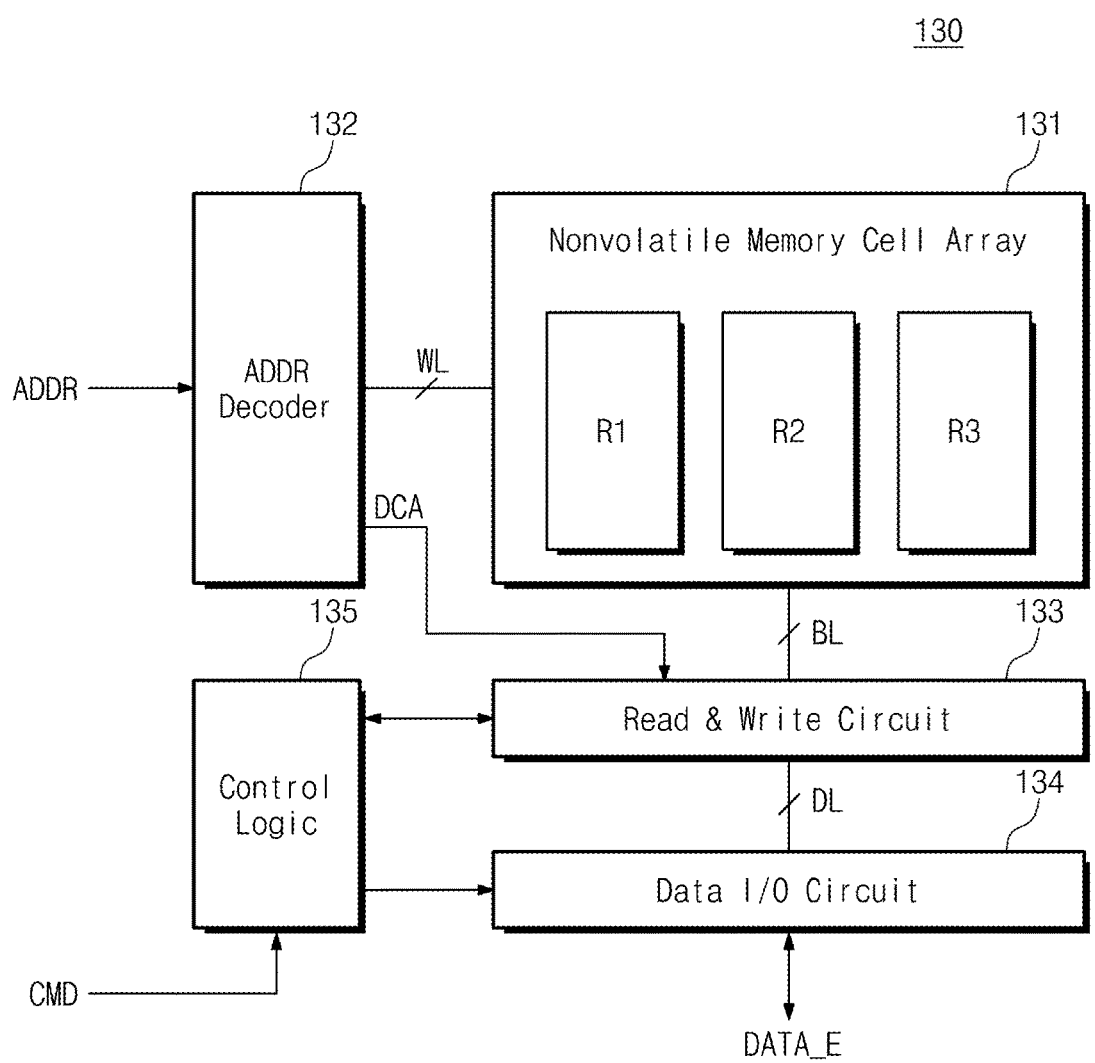
FIG. 10 is a block diagram of a nonvolatile memory according to example embodiments of inventive concepts.

FIG. 10 is a block diagram of a nonvolatile memory 130 according to example embodiments of inventive concepts. As illustrated, the nonvolatile memory 130 includes a nonvolatile memory cell array 131, an address decoder 132, a read and write circuit 133, a data input/output circuit 134, and a control logic 135.

The nonvolatile memory cell array 131 is connected to the address decoder 132 through wordlines WL and connected to the read and write circuit 133 through bitlines BL. The nonvolatile memory cell array 131 includes a plurality of memory cells. Memory cells arranged in a column direction are connected to bitlines BL. For example, memory cell arranged in a column direction may be connected to bitlines BL and a plurality of cell groups may be connected to bitlines BL, respectively.

The nonvolatile memory cell array 131 may operate as a first area R1 that may be used as a cache memory, a second area R2 that may be used as a storage, and a third area R3 that may be used as a main memory. For example, the first to third areas R1 to R3 may include a collection of memory cells of block (BLK) unit or collections of memory cells of bank unit.

The address decoder 132 is connected to the memory cell array through wordlines WL. The address decoder 132 is configured to operate in response to the control of the control logic 135. The address decoder 132 externally receives an address signal ADDR.

The address decoder 132 is configured to decode a row address of the received address signal ADDR. The address decoder 132 selects wordlines WL using the decoded row address.

The address decoder 132 is configured to decode a column address of the received address signal ADDR. The decoded column address DCA is transferred to the read and write circuit 133. In example embodiments, the address decoder 132 includes components such as a row decoder, a column decoder, and/or an address buffer.

The read and write circuit 133 is connected to the memory cell array 131 through bitlines BL and connected to the data input/output circuit 134 through data lines DL. The read and write circuit 133 operates in response to the control of the control logic 135. The read and write circuit 133 is configured to receive the decoded column address DCA from the address decoder 132. The read and write circuit 133 selects bitlines BL using the decoded column address DCA.

In example embodiments, the read and write circuit 133 receives data from the data input/output circuit 134 and writes the received data into the memory cell array 131. The read and write circuit 133 reads encrypted data DATA_E in one of regions of the memory cell array 131 and transfers the read encrypted data DATA_E to the data input/output circuit 134.

In example embodiments, the read and write circuit 133 includes components such as a page buffer and a column selection circuit. In example embodiments, the read and write circuit 133 includes components such as a sense amplifier, a write driver and/or a column selection circuit.

The data input/output circuit 134 is connected to the read and write circuit 133 through data lines DL. The data input/output circuit 134 operates in response to the control of the control logic 135. The data input/output circuit 134 is configured to exchange the encrypted data DATA_E with an external entity. The data input/output circuit 134 is configured to transfer the externally transferred encrypted data DATA_E to the read and write circuit 133 through the data line DL.

The data input/output circuit 134 is configured to output the encrypted data DATA_E transferred from the read and write circuit 133 through the data lines DL to the external entity. In example embodiments, the data input/output circuit 134 includes a component such as a data buffer.

The control logic 135 is connected to the address decoder 132, the read and write circuit 133, and the data input/output circuit 134. The control logic 135 is configured to control the overall operation of the nonvolatile memory 130. The control logic 150 operates in response to an externally transferred command signal CMD.

Figure 11:
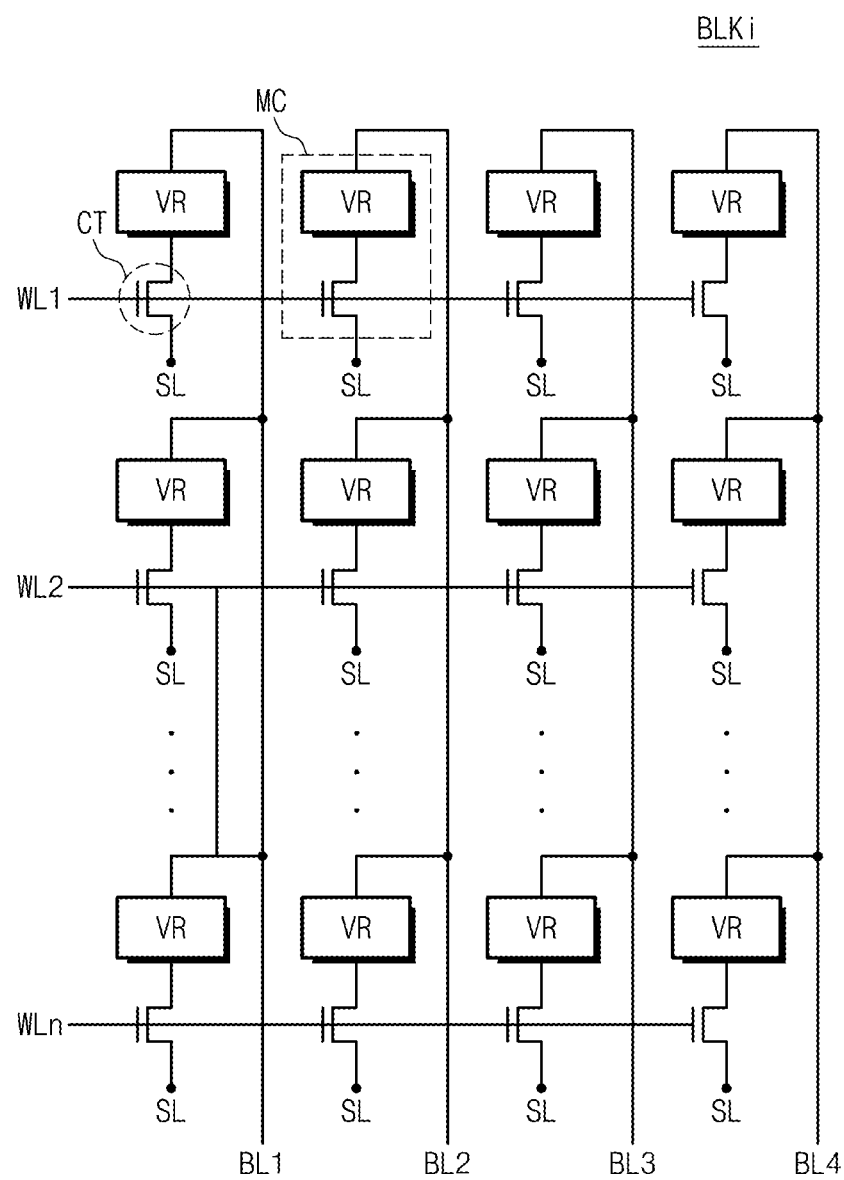
FIG. 11 is a block diagram of a nonvolatile memory cell array according to example embodiments of inventive concepts.

FIG. 11 illustrates the configuration of the nonvolatile memory cell array 131 in FIG. 10. It will be assumed that a given (or, alternatively, desired or predetermined) block of the nonvolatile memory cell array 131 in FIG. 10 is shown in FIG. 11. For brevity of description, it will be assumed that a memory block BLKi in FIG. 11 is connected to four bitlines BL1 to BL4.

Referring to FIG. 11, the memory block BLKi includes a plurality of memory cells MC. Each of the memory cells MC includes a variable resistance memory VR and a cell transistor CT.

A resistance of the variable resistance memory VR varies depending on the magnitude and direction of provided current (or voltage). In addition, the resistance of the variable resistance memory VR is maintained even when the current (or voltage) is cut off. That is, for example, the variable resistance memory VR has nonvolatile characteristics.

The variable resistance memory VR may be implemented using various components. For example, the variable resistance memory VR may be implemented using a spin transfer torque magnetoresistive random access memory (STT-MRAM).

A gate of a cell transistor CT is connected to a wordline WL. The cell transistor CT is switched by a signal provided through the wordline WL. A drain of the cell transistor CT is connected to the variable resistance memory VR, and a source thereof is connected to a source line SL.

For example, sources of cell transistors CT in a plurality of memory cells MC may all be connected to the same source line. For example, sources of cell transistors in a plurality of memory cells MC may be connected to different source lines, respectively.

Figure 12:
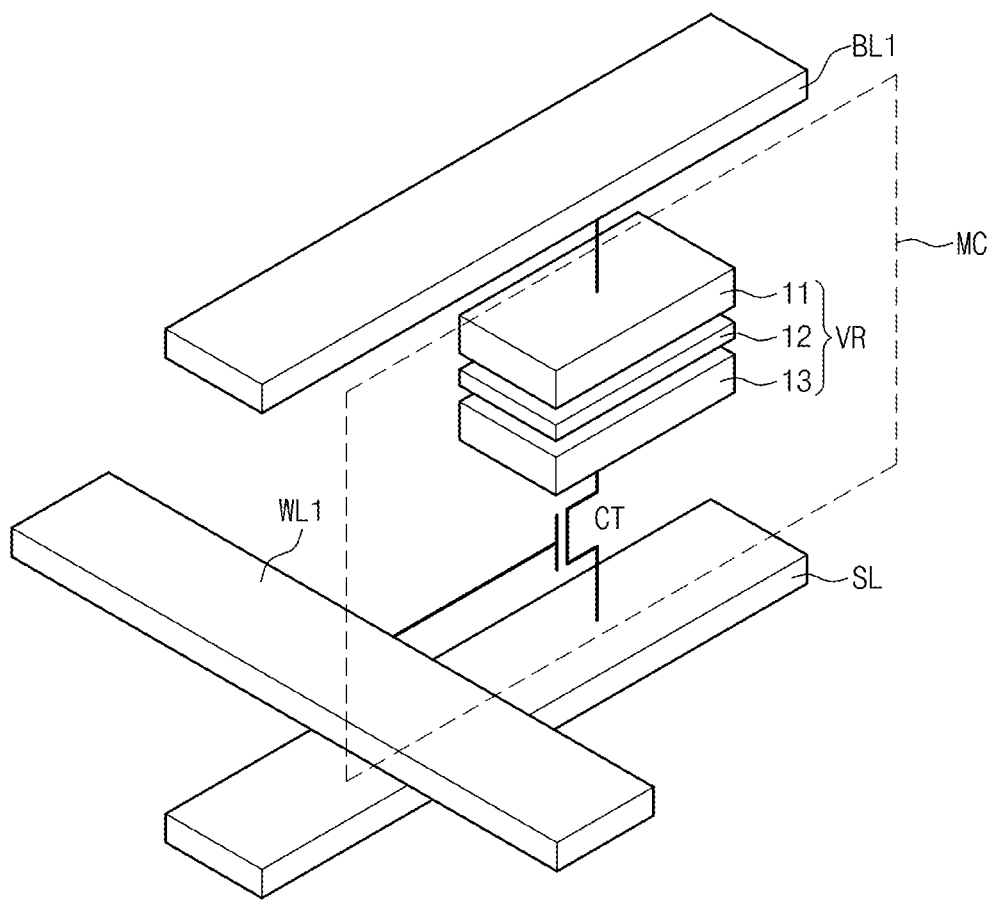
FIG. 12 illustrates an example embodiment of the memory cell in FIG. 11.

FIG. 12 illustrates an example embodiment of the memory cell MC in FIG. 11. The memory cell MC may include a variable resistance memory VR and a cell transistor CT. A gate of the cell transistor CT is connected to a wordline (e.g., a first wordline WL1). One electrode of the cell transistor CT is connected to a bitline (e.g., a first bitline BL1) through the variable resistance memory VR. The other electrode of the cell transistor CT is connected to a source (e.g., a first source line SL1).

The variable resistance memory VR may include a free layer L1, a pinned layer L3, and a tunnel layer L2 disposed there between. A magnetization direction of the pinned layer L3 is fixed, and a magnetization direction of the free layer L1 is identical or opposite to that of the pinned layer L3 according to conditions. The variable resistance memory VR may further include an antiferromagnetic layer (not shown) to fix the magnetization direction of the pinned layer L3.

In example embodiments, the free layer L1 may include a material having a variable magnetization direction. The magnetization direction of the free layer L2 may vary depending on electronic/magnetic factors provided from the outside and/or the inside of a memory cell. The free layer L1 may include a ferromagnetic material including at least one of cobalt (Co), iron (Fe), and nickel (Ni). For example, the free layer L1 may include at least one selected from the group including FeB, Fe, Co, Ni, Gd, Dy, CoFe, NiFe, MnAs, MnBi, MnSb, $CrO_2$, $MnOFe_2O_3$, $FeOFe_2O_3$, $NiOFe_2O_3$, $CuOFe_2O_3$, $MgOFe_2O_3$, EuO, and $Y_3Fe_5O_{12}$.

In example embodiments, the tunnel layer L2 may have a thickness smaller than a spin diffusion distance. The tunnel layer L2 may include a non-magnetic material. For example, the tunnel layer L2 may include at least one selected from oxide of magnesium (Mg), titanium (Ti), aluminum (Al), magnesium-zinc (MgZn) and magnesium-boron (MgB) and nitride of titanium (Ti) and vanadium (V). The tunnel layer L2 may have a given (or, alternatively, desired or predetermined) crystalline structure.

In example embodiments, the pinned layer L3 may have a magnetization direction fixed by an antiferromagnetic layer (not shown). The pinned layer L3 flay include a ferromagnetic material. For example, the pinned layer L3 may include at least one selected from the group including CoFeB, Fe, Co, Ni, Gd, Dy, CoFe, NiFe, MnAs, MnBi, MnSb, $CrO_2$, $MnOFe_2O_3$, $FeOFe_2O_3$, $NiOFe_2O_3$, $CuOFe_2O_3$, $MgOFe_2O_3$, EuO, and $Y_3Fe_5O_{12}$.

In example embodiments, a pinning layer may include an antiferromagnetic material. For example, the pinning layer may include at least one selected from the group including PtMn, IrMn, MnO, MnS, MnTe, $MnF_2$, $FeCl_2$, FeO, $CoCl_2$, CoO, $NiCl_2$, NiO, and Cr.

When a read operation is performed on the memory cell CM, a logic-high voltage is provided to a wordline WL1. The cell transistor CT is turned on in response to the wordline (WL1) voltage. Read current is provided from a bitline BL1 in a source line (SL) direction to measure a resistance of the variable resistance memory VR. Data stored in the variable resistance memory VR may be determined according to the measured resistance. In example embodiments, an extending direction of the wordline WL1 and an extending direction of the source line SL1 may be the same or substantially the same as each other. In example embodiments, an extending direction of the wordline WL1 and an extending direction of the source line SL1 may be perpendicular or substantially perpendicular to each other.

Figure 13:
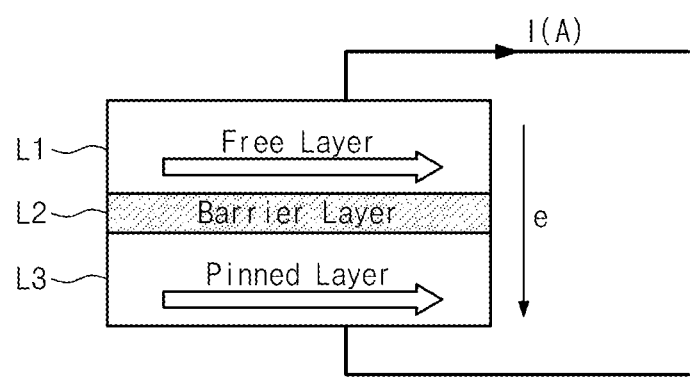
FIGS. 13 and 14 illustrate magnetization directions of a variable resistance memory according to data stored in the memory cell in FIG. 12.
Figure 14:
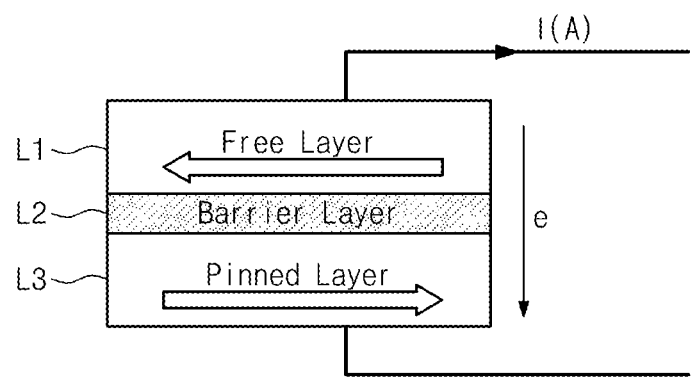

FIGS. 13 and 14 illustrate a magnetization direction of a variable resistance memory VR according to data stored in the memory cell MC in FIG. 12. A resistance of the variable resistance memory VR varies depending on a magnetization direction of a free layer L1. When read current I is provided to the variable resistance memory VR, a data voltage depending on the resistance of the variable resistance memory VR is output. Since the magnitude of the read current I is much smaller than that of write current, the magnetization direction of the free layer L1 does not vary depending on the read current I.

Referring to FIG. 13, in the variable resistance memory VR, a magnetization direction of the free layer L1 and a magnetization direction of a pinned layer L3 are parallel to each other. Thus, the variable resistance memory VR has a low resistance. In this case, data may be determined to be, for example, '0'.

Referring to FIG. 14, in the variable resistance memory VR, a magnetization direction of the free layer L1 and a magnetization direction of a pinned layer L3 are anti-parallel to each other. Thus, the variable resistance memory VR has a high resistance. In this case, data may be determined to be, for example, '1'.

In FIGS. 13 and 14, the free layer L1 and the pinned layer L3 of the variable resistance memory VR are shown as a horizontal magnetic memory. However, inventive concepts are not limited thereto. In example embodiments, the free layer L1 and the pinned layer L3 may be provided using a vertical magnetic memory.

Figure 15:
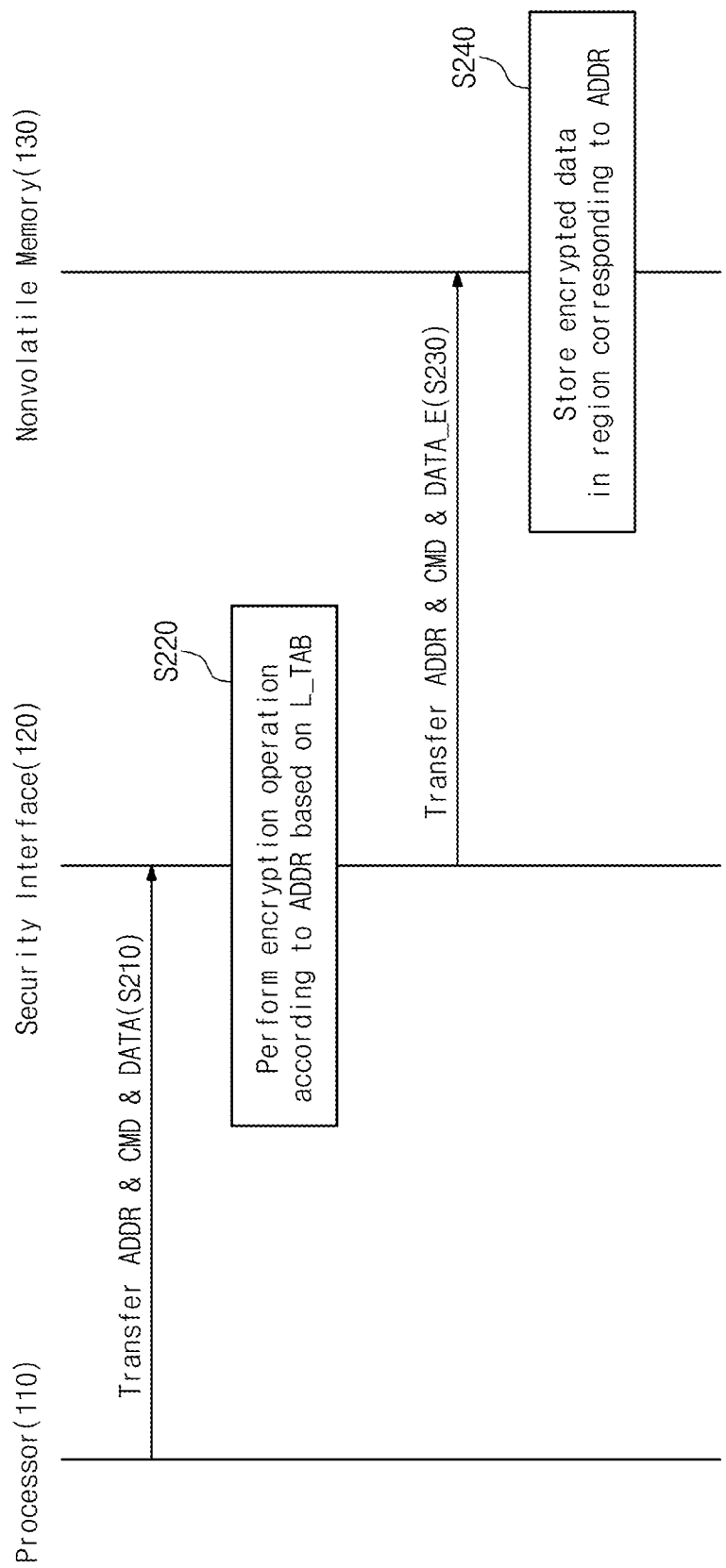
FIG. 15 is a flowchart summarizing a method for performing a write operation on a nonvolatile memory by a system-on-chip according to example embodiments of inventive concepts.

FIG. 15 is a flowchart summarizing a method for performing a write operation on a nonvolatile memory by a system-on-chip according to example embodiments of inventive concepts.

Referring to FIGS. 1, 2, 3, and 15, in S210, the processor 110 may transfer an address signal ADDR, a command signal CMD, and data DATA to the security interface 120.

In S220, the security interface 120 determines an address range AR including the received address signal ADDR based on the level table L_TAB. The security interface 120 performs an encryption operation on the received data DATA according to range characteristics RC corresponding to the determined address range AR.

For example, when the received address signal ADDR belongs to the address range AR of the first range R1 in FIG. 3A, the security interface 120 performs an encryption operation corresponding to the range characteristic RC of the first area R1 on the received data DATA. Referring to FIG. 3B, an encryption operation depending on the range characteristic RC of the first area R1 may not perform an encryption or decryption operation.

For example, when the received address signal ADDR belongs to the address range AR of the second area R2 in FIG. 3A, the security interface 120 performs an encryption operation corresponding to the range characteristic of the second area R2 on the received data DATA. Referring to FIG. 3B, an operation depending on the range characteristic of the second area R2 may be an AES operation.

For example, when the received address signal ADDR belongs to the address range AR of the third area R3 in FIG. 3A, the security interface 120 performs an encryption operation suitable for the range characteristic RC of the third area R3 on the received data DATA. Referring to FIG. 3B, an operation depending on the range characteristic of the third area R3 may be a randomization operation.

In S230, the security interface 120 outputs encrypted data DATA_E to the nonvolatile memory 130. The security interface 120 outputs the address signal ADDR and the command signal CMD received from the processor 110, together with the encrypted data DATA_E, to the nonvolatile memory 130.

In S240, the nonvolatile memory 130 receives the encrypted data DATA_E. The nonvolatile memory 130 stores the received encrypted data DATA_E in an area corresponding to the address signal ADDR.

For example, when the address signal ADDR received by the nonvolatile memory 130 belongs to the address range AR of the first area R1 in FIG. 3A, the nonvolatile memory 130 writes the encrypted data DATA_E into a specific range of the first area R1. Similar to data written into a cache memory (e.g., SRAM), the encrypted data DATA_E written into the specific range of the first area R1 may give the fastest response to a request of a processor.

For example, when the address signal ADDR received by the nonvolatile memory 130 belongs to the address range AR of the second area R2 in FIG. 3A, the nonvolatile memory 130 may write the encrypted data DATA_E into a specific range of the second area R2 used as a storage.

For example, when the address signal ADDR received by the nonvolatile memory 130 belongs to the address range AR of the third area R3 in FIG. 3A, the nonvolatile memory 130 writes the encrypted data DATA_E into a specific range of the third area R3. Similar to data written into a main memory (e.g., DRAM), the encrypted data DATA_E written into the specific range of the third area R3 may give response to a request of the processor.

Figure 16:
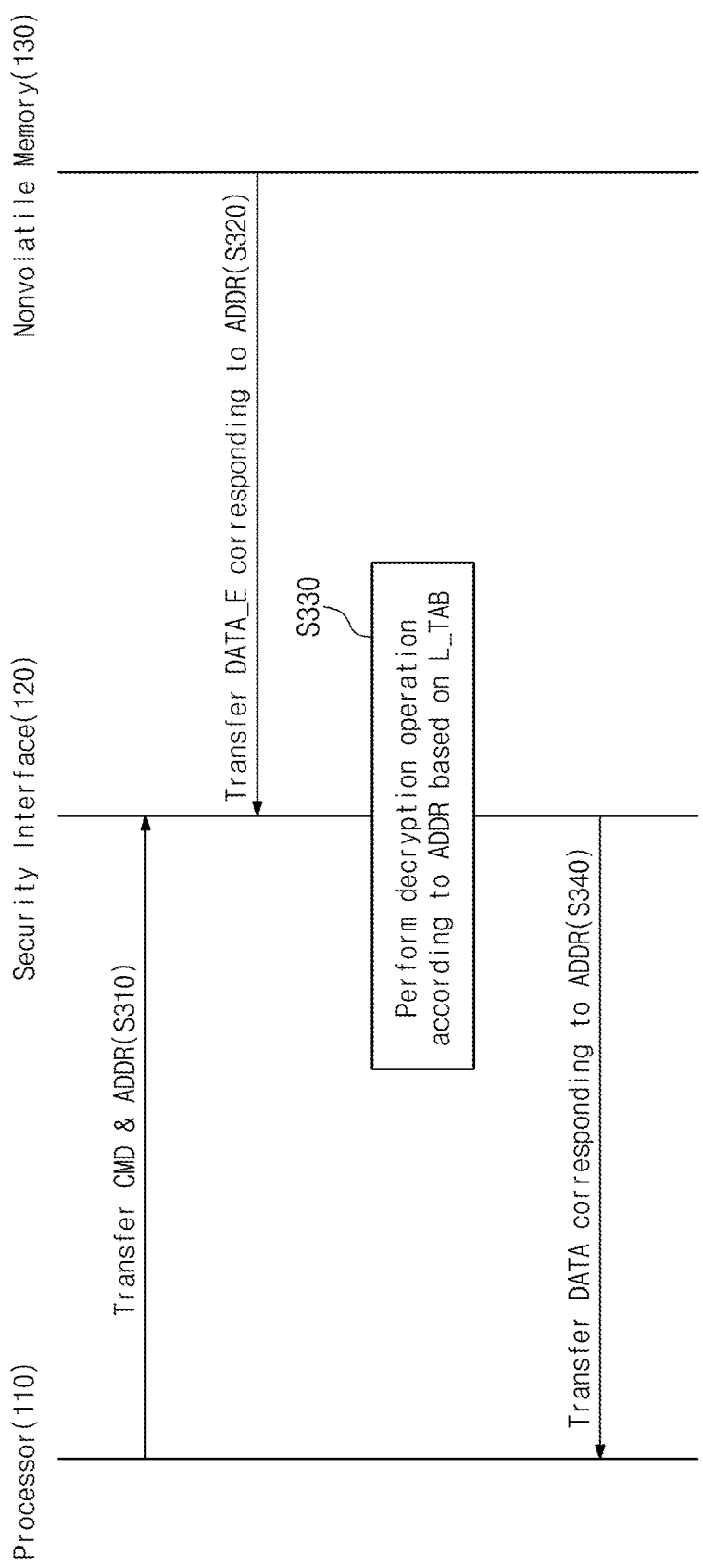
FIG. 16 is a flowchart summarizing a method for performing a read operation on a nonvolatile memory by a system-on-chip according to example embodiments of inventive concepts.

FIG. 16 is a flowchart summarizing a method for performing a read operation on a nonvolatile memory by a system-on-chip according to example embodiments of inventive concepts.

Referring to FIGS. 1, 2, 3, and 16, in S310, the processor 110 may transfer an address signal ADDR and a command signal CMD to the security interface 120. The security interface 120 may transfer the received address signal ADDR and the received command signal CMD to the nonvolatile memory 130.

In S320, the nonvolatile memory 130 transfers encrypted data DATA_E stored in an area corresponding to the address signal ADDR to the security interface 120.

In S330, the security interface 120 may perform a decryption operation depending on the range characteristics RC of an area including the address signal ADDR with reference to the level table L_TAB.

In S340, the security interface 120 transfers data DATA generated through the decryption operation to the processor 110.

Figure 17:
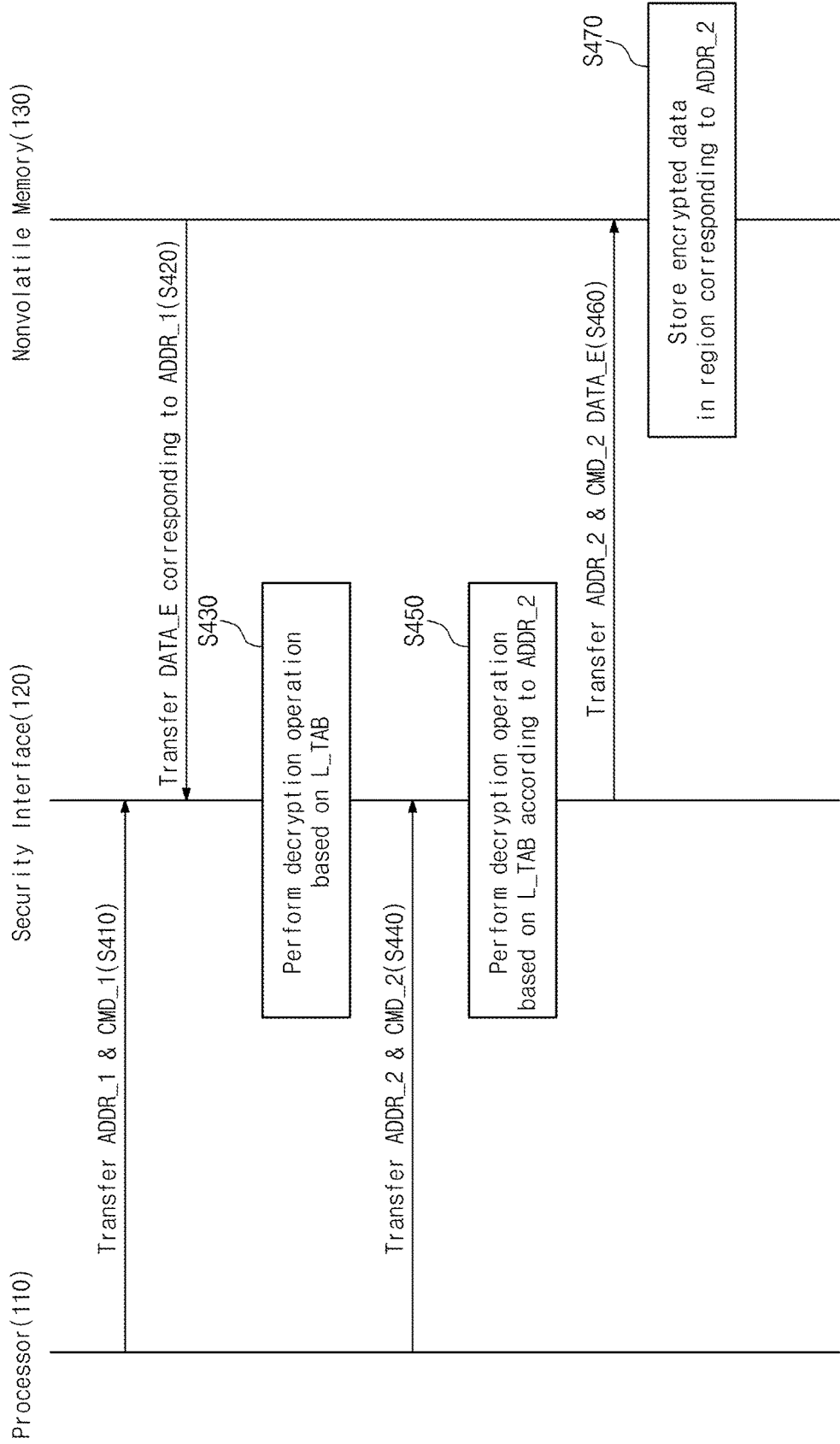
FIG. 17 is a flowchart summarizing a method for performing a write operation on a nonvolatile memory after performing read operation thereon by a system-on-chip according to example embodiments of inventive concepts.

FIG. 17 is a flowchart summarizing a method for performing a write operation on a nonvolatile memory after performing read operation thereon by a system-on-chip according to example embodiments of inventive concepts.

Referring to FIGS. 1 to 3 and FIG. 17, in S410, the processor 110 may transfer a first address signal ADDR_1 and a first command signal CMD_1 to the security interface 120. The security interface 120 transfers the received first address signal ADDR_1 and the received first command signal CMD_1 to the nonvolatile memory 130. For example, the first address signal ADDR_1 may be a signal indicating a specific range of the first area R1. For example, the first command signal CMD_1 may be a read signal.

In S420, the nonvolatile memory 130 transfers encrypted data DATA_E stored in an area corresponding to the first address signal ADDR_1 to the security interface 120 in response to the first address signal ADDR_1 and the first command signal CMD_1. For example, data stored in a specific range of the first area R1 corresponding to the first address signal ADDR_1 has a first encryption level E_L1.

In S430, the security interface 120 performs a decryption operation with reference to the level table L_TAB. The security interface 120 may store data DATA obtained through the decryption operation in a buffer (not shown).

For example, in case of the encrypted data DATA_E having the first encryption level E_L1, the security interface 120 may store encrypted data in a buffer (not shown) without a decryption operation. For example, in case of the encrypted data DATA having the second encryption level E_L2, the security interface 120 may store data obtained by decoding encrypted data based on an AES algorithm in the buffer (not shown). In case of the encrypted data DATA_E having the third encryption level E_L3, the security interface 120 may store data obtained by perform a de-randomization operation on encrypted data in the buffer (not shown).

In S440, the processor 110 may transfer a second address signal ADDR_2 and a second command signal CMD_2 to the security interface 120. The security interface 120 transfers the received second address signal ADDR_2 and the received second command CMD_2 to the nonvolatile memory 130. For example, the second address signal ADDR_2 may be a signal indicating a specific range. For example, the second command signal CMD_2 may be a write signal.

In S450, the security interface 120 determines an address range AR including the received address signal ADDR_2 based on the level table L_TAB. The security interface 120 may re-perform the encryption operation on the data DATA stored in the buffer (not shown) according to range characteristics RC of the determined address range AR.

For example, when the received second address signal ADDR_2 indicates the second area R2 in FIG. 3A, the security interface 120 performs an encryption operation such that the data DATA stored in the buffer (not shown) has the second encryption level E_L2. In example embodiments, referring to FIG. 3B, an operation depending on range characteristics RC of the second encryption level E_L2 may be an AES operation.

In S460, the security interface 120 outputs the encrypted data DATA_E re-encrypted in S450 to the nonvolatile memory 130. The security interface 120 may output the second address signal ADDR_2 and the second command signal CMD_2 received from the processor 110, together with the encrypted data DATA_E, to the nonvolatile memory 130.

In S470, the nonvolatile memory 130 receives the encrypted data DATA_E. The nonvolatile memory 130 stores the encrypted data DATA_E in an area corresponding to the second address signal ADDR_2.

As described with reference to FIG. 17, when data stored in one area of a nonvolatile memory is copied or migrates to another area, encryption and decryption operations may be performed in the security interface 120.

Figure 18:
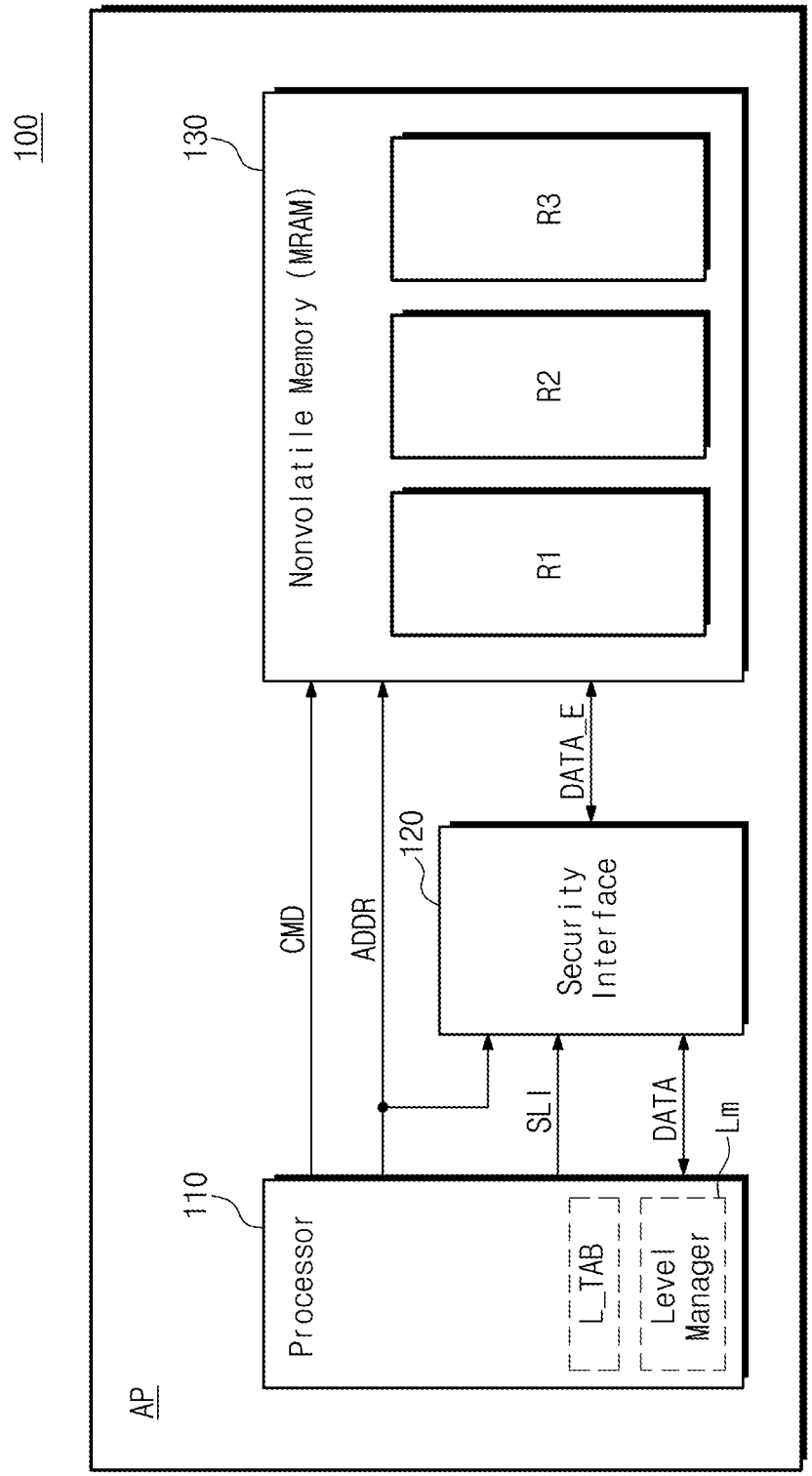
FIG. 18 is a block diagram of a system-on-chip according to example embodiments of inventive concepts which includes a nonvolatile memory.

FIG. 18 is a block diagram of a system-on-chip, according to example embodiments of inventive concepts, which includes a nonvolatile memory. In FIG. 18, sections different from FIG. 1 will be described to avoid duplicate description.

Unlike FIG. 1, a level manager LM of a processor 110 in FIG. 18 may store and manage information on an address range AR for managing areas of a nonvolatile memory 130 and information on range characteristics RC of respective ranges in a level table L_TAB.

When data DATA is output to the security interface 120 from the processor 110, the processor 110 generates a security level signal SLI based on the level table L_TAB with reference to the output address signal. The processor 110 outputs the security level signal SLI together with the data DATA. In example embodiments, the security level signal SLI may include information on the range characteristics RC of the nonvolatile memory 130 into which the data DATA is finally written according to the address signal ADDR. Unlike FIG. 1, the processor 110 may transfer (e.g., directly transfer) the command signal CMD to the nonvolatile memory 130 without passing through the security interface 120.

The security interface 120 may perform an encryption operation of the received data DATA according to the security level signal SLI. The security interface 120 outputs the encrypted data DATA_E to the nonvolatile memory 130. The security interface 120 may perform a decryption operation of the received encrypted data DATA_E according to the security level signal SLI. The security interface 120 may output the decrypted data DATA to the processor 110. It is to be understood that in FIG. 18, the same components or parts as those shown in FIG. 1 will be not described in further detail.

Figure 19:
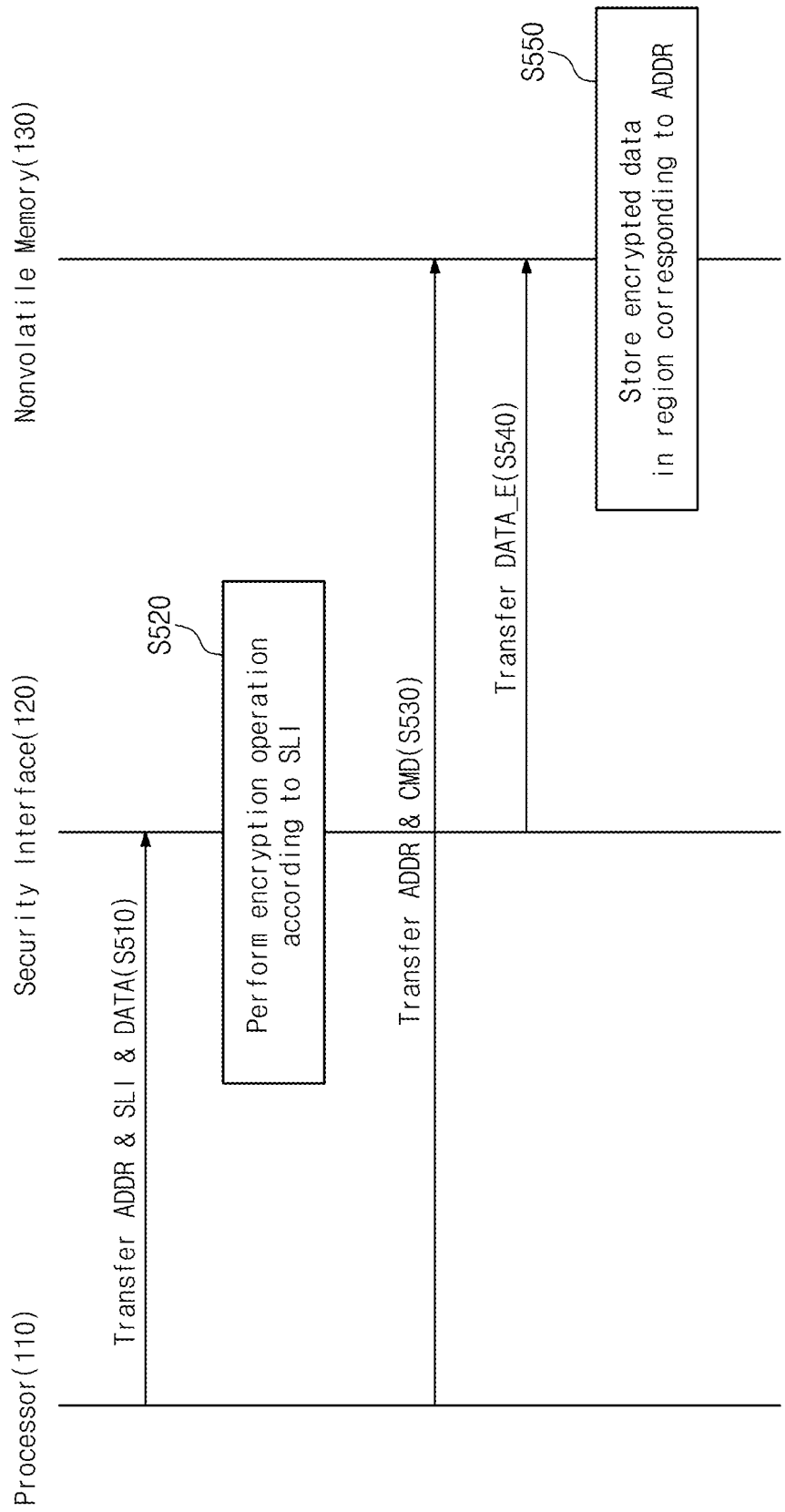
FIG. 19 is a flowchart summarizing a method for performing a write operation on a nonvolatile memory by a system-on-chip according to example embodiments of inventive concepts.

FIG. 19 is a flowchart summarizing a method for performing a write operation on a nonvolatile memory by a system-on-chip according to example embodiments of inventive concepts.

Referring to FIGS. 18 and 19, in S510, the processor 110 may transfer the security level signal SLI, together with the address signal ADDR and the data DATA, to the security interface 120.

In S520, the security interface 120 stores the security level signal SLI. The security interface 120 may perform an encryption operation based on the security level signal SLI, the address signal ADDR, and the data DATA received from the processor 110. The security interface 120 may store the encrypted data DATA_E generated through the encryption operation in a buffer (not shown) of the security interface 120.

In S530, the processor 110 transfers the address signal ADDR and the command signal CMD to the nonvolatile memory 130.

In S540, the security interface 120 transfers the encrypted data DATA_E to the nonvolatile memory 130.

In S550, the nonvolatile memory 130 receives the encrypted data DATA_E. The nonvolatile memory 130 stores the encrypted data DATA_E in an area corresponding to the address signal ADDR.

Figure 20:
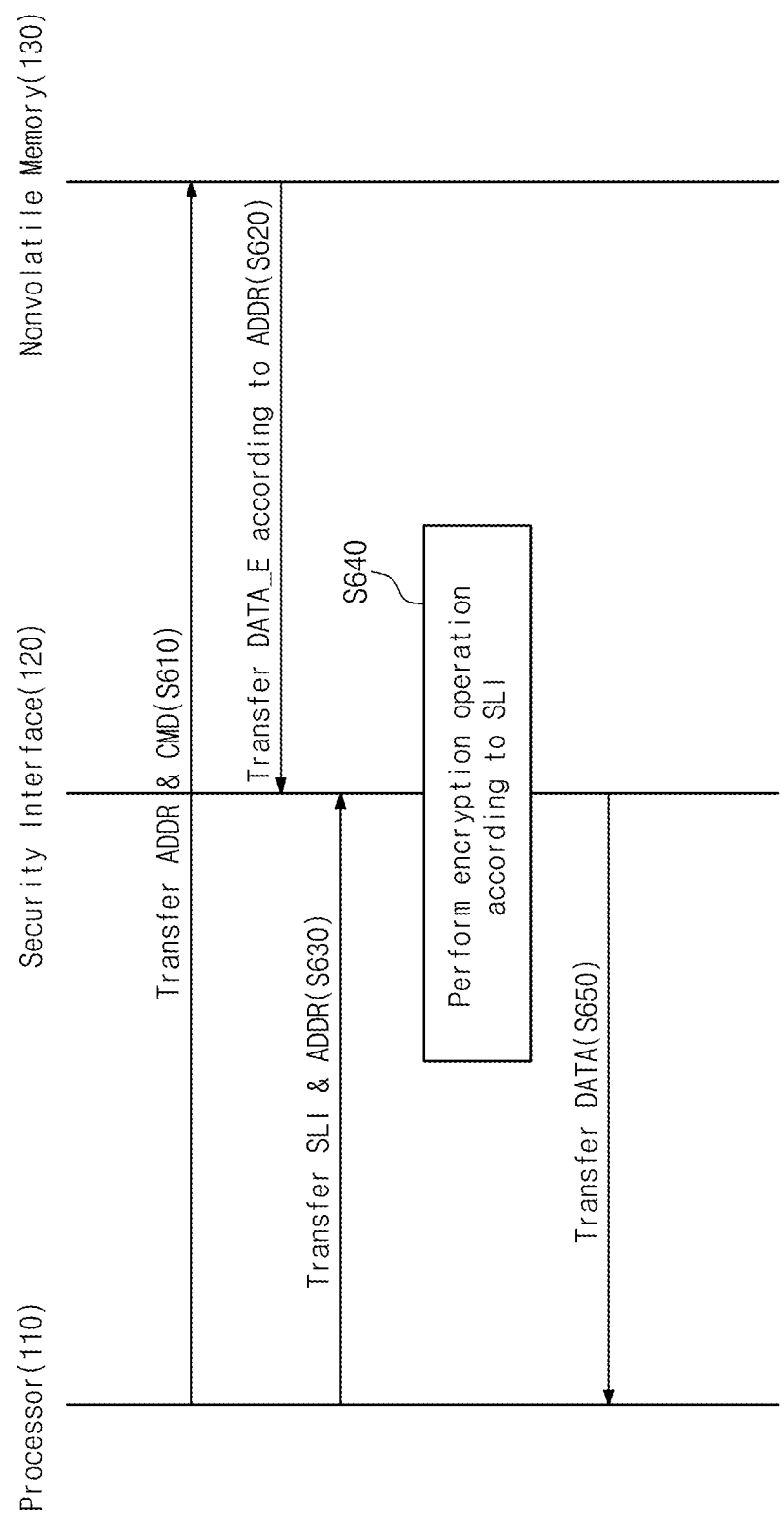
FIG. 20 is a flowchart summarizing a method for performing a write operation on a nonvolatile memory by a system-on-chip according to example embodiments of inventive concepts.

FIG. 20 is a flowchart summarizing a method for performing a write operation on a nonvolatile memory by a system-on-chip according to example embodiments of inventive concepts.

Referring to FIGS. 18 and 20, in S610, the processor 110 transfers the address signal ADDR and the command signal CMD to the nonvolatile memory 130.

In S620, the nonvolatile memory 130 transfers encrypted data DATA_E stored in an area corresponding to the address signal ADDR to the security interface 120. The security interface 120 may store the encrypted data DATA_E in a buffer (not shown) of the security interface 120.

In S630, the processor 110 transfers a security level signal SLI to the security interface 120. The processor 110 may transfer the address signal ADDR to the security interface 120.

In S640, the security interface 120 may perform a decryption operation on the encrypted data DATA_E stored in the buffer (not shown) based on the received security level signal SLI.

In S650, the security interface 120 may output data DATA obtained by performing the decryption operation on the encrypted data DATA_E to the processor 110.

Figure 21:
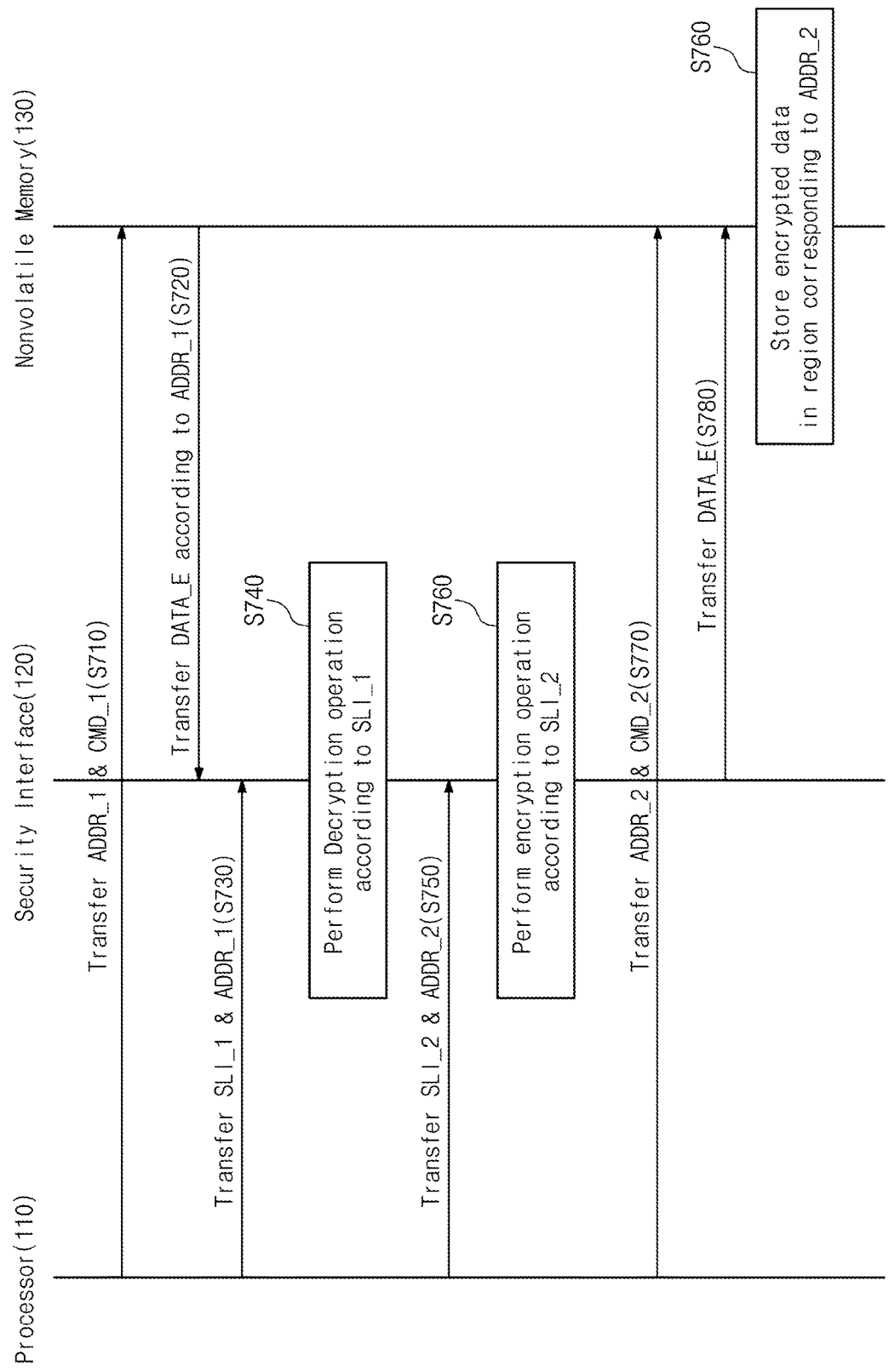
FIG. 21 is a flowchart summarizing a method for performing a write operation on a nonvolatile memory after performing a read operation thereon by a system-on-chip according to example embodiments of inventive concepts.

FIG. 21 is a flowchart summarizing a method for performing a write operation on a nonvolatile memory after performing a read operation thereon by a system-on-chip according to example embodiments of inventive concepts.

Referring to FIGS. 18 and 21, in S710, the processor 110 transfers a first address signal ADDR_1 and a first command signal CMD_1 to the nonvolatile memory 130. For example, the first address signal ADDR_1 may be a signal indicating a specific range of the first area R1. For example, the first command signal CMD_1 may be a read signal.

In S720, the nonvolatile memory 130 transfers the encrypted data DATA_E stored in a specific range corresponding to the first address signal ADDR_1 to the security interface 120 in response to the first address signal ADDR_1 and the first command signal CMD_1.

In S730, the processor 110 may transfer a first security level signal SLI_1 to the security interface 120. The processor 110 may transfer the first address signal ADDR_1 to the security interface 120.

In S740, the security interface 120 stores the first security level signal SLI_1. The security interface 120 may perform a decryption operation on the encrypted data DATA_E based on the first security level signal SLI_1. The security interface 120 may store data DATA generated through the decryption operation in the buffer (not shown) of the security interface 120.

In S750, the processor 110 may transfer a second security level signal SLI_2 to the security interface 120. The processor 110 may transfer a second address signal ADDR_2 to the security interface 120.

In S760, the security interface 120 stores the second security level signal SLI_2. The security interface 120 may re-perform the encryption operation on the data DATA stored in the buffer (not shown) based on the second security level signal SLI_2. The security interface 120 may store the encrypted data DATA_E generated through the encryption operation in the buffer (not shown) of the security interface 120.

In S770, the processor 110 transfers the second address signal ADDR_2 and a second command signal CMD_2 to the nonvolatile memory 130. For example, the second address signal ADDR_2 may be a signal indicating a second area R2. For example, the second command signal CMD_2 may be a write signal.

In S780, the security interface 120 may output the encrypted data DATA_E generated based on the second security level signal SLI_2 to the nonvolatile memory 130.

In S790, the nonvolatile memory 130 receives the encrypted data DATA_E. The nonvolatile memory 130 may store the encrypted data DATA_E in an area corresponding to the second address signal ADDR_2.

As described above, according to example embodiments of inventive concepts, a system-on-chip includes a single nonvolatile memory. The single nonvolatile memory is divided into a plurality of areas, which are used for different purposes. Accordingly, since the system-on-chip need not include different memories for different purposes, a size of the system-on-chip may decrease. Moreover, different security levels are set to the areas of the nonvolatile memory according to the purposes of the areas of the nonvolatile memory. Thus, security of the system-on-chip including the nonvolatile memory may be improved.

FIG. 22 illustrates a wearable device 1000 according to example embodiments of inventive concepts. As illustrated, the wearable device 1000 may include a watch body 1100, a watch band 1200, and a biosensor 1300.

The watch body 1100 may be implemented with a system-on-chip including a processor, a memory, an input/output (I/O) device, a display, a communication interface, a plurality of sensors, and a power management unit. The system-on-chip included in the watch body 1100 may be implemented with a system-on-chip (SoC). The processor of the watch body 1100 may include a single processor having at least one core or multiple processors each having at least one core.

The memory of the watch body 1100 may be a magnetic random access memory (MRAM). A system-on-chip according to example embodiments of inventive concepts may manage an area of a magnetic random access memory (MRAM) as a cache memory area, a main memory area, and a storage area. Thus, the system-on-chip may operate without addition of a memory device (e.g., DRAM, SRAM or flash memory) to be advantageous in scaling down a device. As shown in FIG. 17, the appearance of the display of the watch body 1100 may be implemented as a circle type or a round type.

The watch band 1200 may include the biosensor 1300 configured to sense a physiological signal from at least one user. For example, the biosensor 1300 may be attached to the body of a user of the wearable device 1000 to sense a bio-signal (e.g., heartbeat). As mentioned above, a user's bio-signal may be used in an encryption operation of data.

FIG. 23 is a block diagram of a system-on-chip 100 including a nonvolatile memory according to example embodiments of inventive concepts. A difference between the system-on-chip 100 in FIG. 23 and the system-on-chip 100 in FIG. 1 is that unlike the security interface 120 in FIG. 1, a security interface 120 in FIG. 23 includes a level manager LM. Accordingly, when the security interface 120 receives level information LI from a processor 110, the security interface 120 may manage an area of the nonvolatile memory after dividing the area into at least three areas R1, R2, and R3 through an initial setup and manage an address range ADDR Range (AR) of each of the first to third areas R1, R2, and R3. The security interface 120 may set up a security level of each of the first to third areas R1, R2, and R3 through the initial setup. The security interface 120 may generate and manage a level table L_TAB based on the initial setup. It is to be understood that in FIG. 23, except for the security interface 120, the same components or parts as those shown in FIG. 1 will be not described in further detail.

Figure 24:
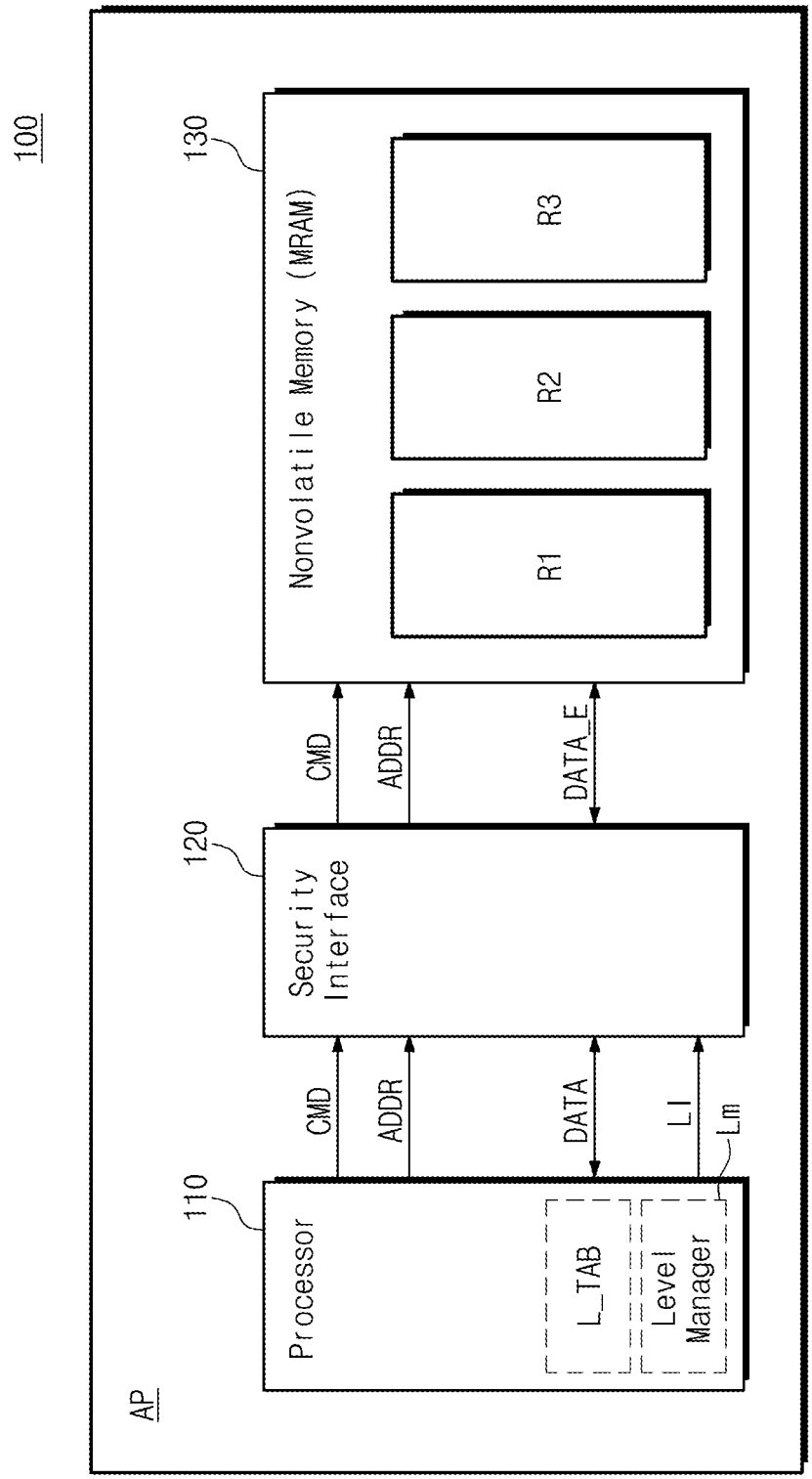
FIG. 24 is a block diagram of a system-on-chip including a nonvolatile memory according to example embodiments of inventive concepts.

FIG. 24 is a block diagram of a system-on-chip 100 including a nonvolatile memory according to example embodiments of inventive concepts. A difference between the system-on-chip 100 in FIG. 24 and the system-on-chip 100 in FIG. 1 is that unlike the security interface 120 in FIG. 1, a security interface 120 in FIG. 24 includes a level table L_TAB. Accordingly, the processor 110 in FIG. 24 may generate and manage information on an address range and range characteristics of an area divided by the level manager LM in the form of the level table L_TAB. The processor in FIG. 24 may determine range characteristics RC of an address range including an address signal ADDR output to the security interface 120 based on the level table L_TAB. The processor 110 in FIG. 24 may output information on the determined range characteristics RC as level information LI. The security interface 120 may receive the level information LI and perform an encryption operation and a decryption operation at a security level corresponding to the received level information LI based on the received level information LI.

As shown in FIGS. 23 and 24, the area of the nonvolatile memory 130 is divided into three areas. However, it is to be understood that the area of the nonvolatile memory 130 may be divided into more than three areas (e.g., five areas as in FIG. 4, or more than five areas).

As described above, since a memory system uses a magnetic random access memory (MRAM) as a main memory, the memory system consumes less power than when using a dynamic random access memory (DRAM) as a main memory. In addition, the memory system does not need an additional device because an area of the MRAM is used after being divided according to functions. In this regard, according to at least one example embodiment, system-on-chips and/or memory systems need not include a separate volatile memory (e.g., SRAM, DRAM, SDRAM, etc.). Thus, the memory system may be advantageous in scaling down a device including the memory system. Moreover, since the memory system sets security suitable for each of the divided areas, the memory system may improve security of the data.

As is traditional in the field of the inventive concepts, embodiments are described, and illustrated in the drawings, in terms of circuits, functional blocks, units and/or modules. Those skilled in the art will appreciate that the circuits, blocks, units and/or modules (e.g., determination circuits, cryptographic circuits, etc.) may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of inventive concepts is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A system-on-chip comprising:
   a magnetic random access memory configured to include a plurality of memory areas, the magnetic random access memory configured to store, in response to a command signal and an address signal, encrypted data in the plurality of memory areas based on the address signal;
   at least one processor configured to execute computer-readable instructions to divide the magnetic random access memory into the at least three memory areas, output the command signal, the address signal, and a level information signal, the level information signal setting a security level of each of the at least three memory areas, and input and output data; and a security interface configured to selectively convert data received from the at least one processor into the encrypted data having the security level associated with the address signal, the security level based on the level information signal, by performing a randomization operation on the received data in response to the address signal indicating an address of a particular memory area of the at least three memory areas, and output the encrypted data to the magnetic random access memory.

2. The system-on-chip as set forth in claim 1, wherein the at least three memory areas include a cache memory area requiring a highest input/output speed among the at least three memory areas;

a main memory area; and a storage area requiring a highest security level among the at least three memory areas.

3. The system-on-chip as set forth in claim 2, wherein the at least one processor is further configured to execute computer-readable instructions to set a security level of the cache memory area to a lowest security level among the at least three memory areas;

set the security level of the storage area to the highest security level among the at least three memory areas; and set a security level of the main memory area to a security level between the lowest security level and the highest security level.

4. The system-on-chip as set forth in claim 2, wherein the magnetic random access memory is configured to erase the encrypted data stored in the cache memory area and the main memory area in response to the magnetic random access memory being powered off; and retain the encrypted data stored in the storage area in response to the magnetic random access memory being powered off.

5. The system-on-chip as set forth in claim 1, wherein the security interface includes a register configured to store level information obtained from the level information signal;

a first determination circuit configured to output an operation select signal based on the command signal;

a second determination circuit configured to output a level select signal based on the address signal; and a cryptographic circuit including an encryption and decryption unit and a randomizer, the cryptographic circuit configured to based on the level select signal, activate one of the encryption and decryption unit and the randomizer or deactivate both the encryption and decryption unit and the randomizer, and perform encryption or decryption of the data according to the operation select signal.

6. The system-on-chip as set forth in claim 5, wherein the first determination circuit is further configured to output the operation select signal based on the command signal, the command signal being a write signal, the cryptographic circuit encrypts the data into the encrypted data; and the command signal being a read signal the cryptographic circuit decrypts the encrypted data into the data.

7. The system-on-chip as set forth in claim 5, wherein the second determination circuit is further configured to determine a first memory area including an address corresponding to the address signal with reference to the level information stored in the register; and output information associated with the determined first memory area as the level select signal.

8. The system-on-chip as set forth in claim 5, wherein the encryption and decryption unit is configured to perform at least one of an encryption and decryption operation according to an encryption algorithm in response to the encryption and decryption unit activating according to the level select signal; and the randomizer is configured to perform a randomization operation in response to the randomizer activating.

9. A system-on-chip comprising:

a magnetic random access memory including a plurality of memory areas, the plurality of memory areas including at least three memory areas, each of the plurality of memory areas having a different security level; and security interface circuitry configured to identify a memory area from among the plurality of memory areas based on a received memory address associated with a received memory command, determine a security level associated with the identified memory area, and perform a memory operation on received data based on the received memory command and the determined security level, wherein the memory operation includes selectively processing the received data by performing a randomization operation on the received data in response to the received memory address indicating an address of a particular memory area of the plurality of memory areas, encrypting the received data according to the security level associated with the identified memory area, and writing the encrypted data to the identified memory area of the magnetic random access memory.

10. The system-on-chip of claim 9, wherein each of the plurality of memory areas is associated with an address range from among a plurality of address ranges of the magnetic random access memory; and the security interface circuitry is further configured to determine the address range including the received memory address, and to identify the memory area based on the determined address range.

11. The system-on-chip of claim 10, wherein the security interface circuitry is further configured to generate a level table storing each of the plurality of address ranges in association with a corresponding security level.

12. The system-on-chip of claim 11, wherein the security interface circuitry is further configured to generate the level table based on received level information, the received level information indicating security levels associated with the plurality of address ranges of the magnetic random access memory.

13. The system-on-chip of claim 9, wherein the memory operation includes decrypting the received data based on the security level associated with the identified memory area; and outputting the decrypted data.

14. The system-on-chip of claim 9, wherein the security interface circuitry includes a determining circuit configured to perform generating an operation select signal based on the received memory command, the identify the memory area from among the plurality of memory areas based on the received memory address, the determine the security level associated with the identified memory area, and generating a security level select signal based on the determined security level; and a cryptographic circuit configured to encrypt the received data based on the security level select signal, and output the encrypted data to the magnetic random access memory.

15. The system-on-chip of claim 14, wherein the cryptographic circuit is further configured to encrypt the received data based on the security level select signal and a bio signal received from a bio sensor.

16. The system-on-chip of claim 14, wherein each of the plurality of memory areas is associated with a corresponding address range from among a plurality of address ranges of the magnetic random access memory;

the security interface circuitry is further configured to determine an address range including the received memory address, and to identify the memory area based on the determined address range; and the determining circuit includes a first determination circuit configured to generate the operation select signal based on the received memory command, a register storing, in a level table, each of the plurality of address ranges in association with a corresponding security level, and a second determination circuit configured to determine the security level associated with the identified memory area using the level table, and generate the security level select signal based on the determined security level.

17. The system-on-chip of claim 9, further comprising:

one or more processors configured to output, to the security interface circuitry, the memory command, the memory address, the data, and level information, the level information including the security level associated with each of the plurality of memory areas;

wherein an address range is associated with each of the plurality of memory areas; and wherein the security interface circuitry is further configured to generate a level table based on the received level information, the level table storing each address range in association with a corresponding security level, and determine the security level associated with the identified memory area based on the level table.

* * * * *